(12) United States Patent  
Madhusudan

(10) Patent No.: US 12,159,991 B2  
(45) Date of Patent: ***Dec. 3, 2024

(54) FORMING BATTERY ELECTRODES AND ASSOCIATED BATTERY

(71) Applicant: Textron Innovations Inc., Providence, RI (US)

(72) Inventor: Phalgun Madhusudan, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/446,264

(22) Filed: Aug. 8, 2023

(65) Prior Publication Data

US 2024/0021778 A1 Jan. 18, 2024

Related U.S. Application Data

(63) Continuation of application No. 17/385,506, filed on Jul. 26, 2021, now Pat. No. 11,769,867.

(51) Int. Cl.
*H01M 4/04* (2006.01)
*H01M 4/48* (2010.01)
*H01M 4/583* (2010.01)

(52) U.S. Cl.
CPC .......... *H01M 4/0426* (2013.01); *H01M 4/48* (2013.01); *H01M 4/583* (2013.01)

(58) Field of Classification Search
CPC ...... H01M 4/0426; H01M 4/48; H01M 4/583; H01M 4/0423; Y02E 60/10; Y02P 70/50
See application file for complete search history.

(56) References Cited

U.S. PATENT DOCUMENTS

| 9,856,432 B2 | 1/2018 | Zou et al. | |
| 11,769,867 B2 * | 9/2023 | Madhusudan | H01M 4/48 429/209 |

(Continued)

FOREIGN PATENT DOCUMENTS

| WO | 2005106990 A2 | 11/2005 |
| WO | 2011066518 A1 | 6/2011 |

(Continued)

OTHER PUBLICATIONS

Conedera et al., "Fabrication of Activated Carbon Electrodes by Inkjet Deposition", LAAS-CNRS, Université de Toulouse, 7 Av. du Colonel Roche 31077 Toulouse, France, 5 pages.

(Continued)

*Primary Examiner* — Matthew T Martin
*Assistant Examiner* — Bartholomew A Hornsby
(74) *Attorney, Agent, or Firm* — Slater Matsil, LLP

(57) ABSTRACT

In certain embodiments, a method includes forming a battery electrode on a substrate. Forming the battery electrode on the substrate includes depositing a first electrode active material layer on a first portion of a surface of the substrate and depositing, to form a current collector, a conductive material using a thin film deposition process on a surface of the first electrode active material layer. The conductive material is deposited over an edge of the first electrode active material layer and onto a second portion of the surface of the substrate, the second portion of the substrate being adjacent to the first portion of the substrate. The method includes removing the battery electrode from the substrate, the battery electrode including the first electrode active material layer and the current collector.

20 Claims, 10 Drawing Sheets

Cross-Sectional View

Plan View

Cross-Sectional View

Plan View

(56) References Cited

U.S. PATENT DOCUMENTS

| | | |
|---|---|---|
| 2013/0252054 A1 | 9/2013 | Barone et al. |
| 2016/0013516 A1 | 1/2016 | Heishi et al. |
| 2019/0334131 A1 | 10/2019 | Levin |
| 2020/0083508 A1 | 3/2020 | Herrmann et al. |
| 2020/0168872 A1 | 5/2020 | Fu et al. |
| 2020/0185700 A1 | 6/2020 | Kamiyama et al. |
| 2020/0185764 A1 | 6/2020 | Liao et al. |
| 2020/0259184 A1 | 8/2020 | Park et al. |
| 2021/0060638 A1 | 3/2021 | Herle |
| 2021/0091369 A1 | 3/2021 | Dadheech et al. |
| 2021/0184276 A1 | 6/2021 | Iguchi |
| 2023/0021931 A1* | 1/2023 | Madhusudan ........ H01M 4/139 |

FOREIGN PATENT DOCUMENTS

| | | |
|---|---|---|
| WO | 2016205663 A1 | 12/2016 |
| WO | 2017222658 A1 | 12/2017 |
| WO | 2019094121 A1 | 5/2019 |
| WO | 2020219201 A1 | 10/2020 |

OTHER PUBLICATIONS

Hawley et al., "Electrode manufacturing for lithium-ion batteries—Analysis of current and next generation processing,", Journal of Energy Storage, vol. 25, 2019, 100862, ISSN 2352-152X, https://doi.org/10.1016/j.est.2019.100862., 36 pages.

Ludwig et al., "Solvent-Free Manufacturing of Electrodes for Lithium-ion Batteries", Scientific Reports | 6:23150 | DOI: 10.1038/srep23150, www.nature.com/scientificreports/, published Mar. 17, 2016, 10 pages.

Lighting Global., "Lithium-ion Batteries Part I: General Overview and 2019 Update", Technical Notes, Issue #30, Jun. 2019, 12 pages.

Unno et al., "Fe-based Metal Foils for Current Collectors in Li-ion Secondary Batteries", Nippon Steel Technical Report No. 122, pp. 165-175, Nov. 2019, 11 pages.

Voelker et al., "Trace Degradation Analysis of Lithium-Ion Battery Components", R& D Magazine, www.RDmag.com, Apr. 2014, 5 pages.

Yu et al., "Surface hydrophobicity and oleophilicity of hierarchical metal structures fabricated using ink-based selective laser melting of micro/nanoparticles" Nanotechnology Reviews, vol. 9, No. 1, 2020, pp. 626-636. https://doi.org/10.1515/ntrev-2020-0050., 11 pages.

\* cited by examiner

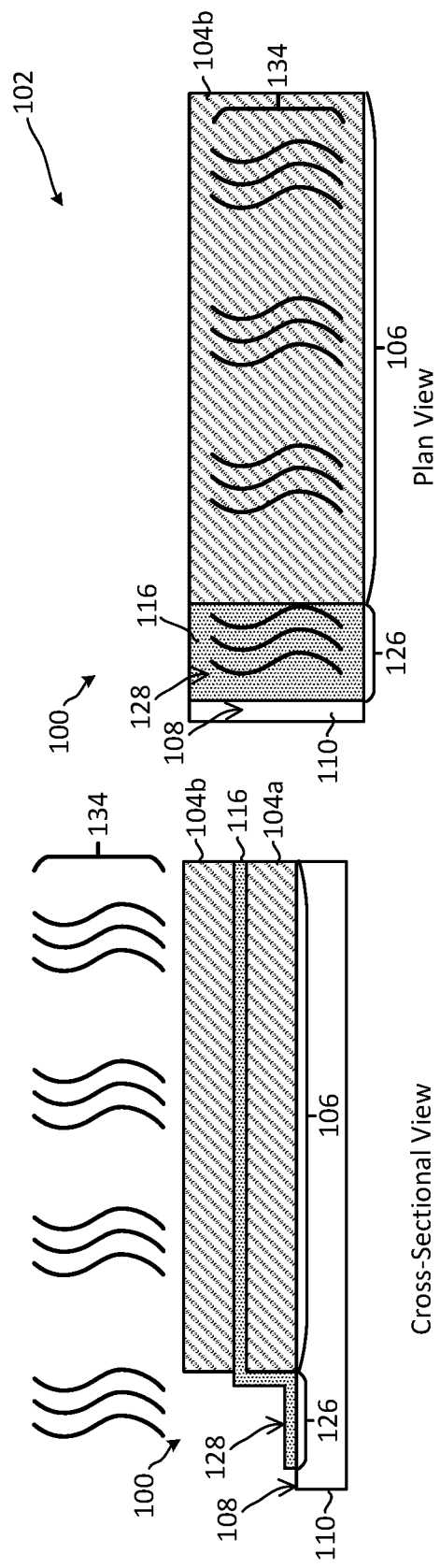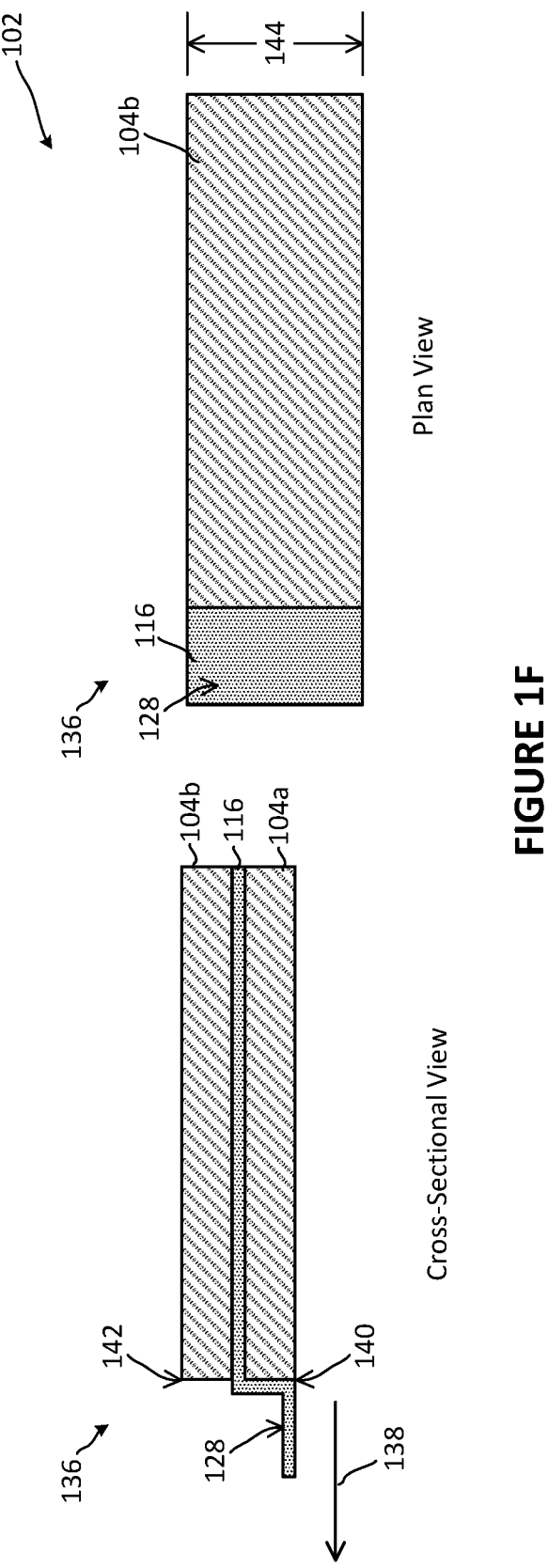
FIGURE 1E
FIGURE 1F

Plan View

FORMING BATTERY ELECTRODES AND ASSOCIATED BATTERY

CROSS-REFERENCE TO RELATED APPLICATIONS

This application is a continuation of pending U.S. application Ser. No. 17/385,506 filed on Jul. 26, 2021, and entitled "Forming Battery Electrodes and Associated Battery," which application is incorporated herein by reference in its entirety.

TECHNICAL FIELD

This disclosure relates generally to battery technology, and, in particular embodiments, to forming battery electrodes and an associated battery.

BACKGROUND

Lithium-ion batteries have become a popular power source choice due to their potential to provide a combination of cyclability, large capacity, and high power. Lithium-ion batteries may be used as power sources for mobile phones, laptop computers, electric vehicles, hybrid electric vehicles, and many other electronic apparatuses/machines.

A lithium-ion cell may include one or more positive electrodes (e.g., cathodes) and one or more negative electrodes (e.g., anode) separated by a polymeric separator. An electrolyte (e.g., organic) material may be provided within a battery casing. One or more current collectors connected to the positive or negative electrode carry charge or current from the battery to one or more external devices. Lithium-ion batteries may be charged and discharged through movement of lithium ions between the positive and negative electrodes.

SUMMARY

In certain embodiments, a method includes providing a first substrate and forming a first battery electrode on the first substrate. Forming the first battery electrode on the first substrate includes depositing a first layer of a first electrode active material on a first portion of a surface of the first substrate and forming a first current collector that includes a first conductive material. Forming the first current collector includes depositing, using a sputter deposition process, the first conductive material on a surface of the first layer of the first electrode active material. The first conductive material is deposited over an edge of the first layer of the first electrode active material and onto a second portion of the surface of the first substrate, the second portion of the first substrate being adjacent to the first portion of the first substrate. The method further includes removing the first battery electrode from the first substrate, the first battery electrode including the first layer of the first electrode active material and the first current collector.

In certain embodiments, a method includes forming a first cathode on a first substrate. Forming the first cathode on the first substrate includes depositing a first layer of a cathode active material on a first portion of a surface of the first substrate and forming a first cathode current collector that includes a first conductive material. Forming the first cathode current collector includes depositing, using a physical vapor deposition (PVD) process, the first conductive material on a surface of the first layer of the cathode active material. The first conductive material is deposited over an edge of the first layer of the cathode active material and onto a second portion of the surface of the first substrate, the second portion of the first substrate being adjacent to the first portion of the first substrate. The method includes removing the first cathode from the first substrate, the first cathode including the first layer of the cathode active material and the first cathode current collector. The method further includes forming a first anode on a second substrate. Forming the first anode on the second substrate includes depositing a first layer of an anode active material on a first portion of a surface of the second substrate and forming a first anode current collector that includes a second conductive material. Forming the first anode current collector includes depositing, using a PVD process or chemical vapor deposition (CVD) process, the second conductive material on a surface of the first layer of the anode active material. The second conductive material is deposited over an edge of the first layer of the anode active material and onto a second portion of the surface of the second substrate, the second portion of the second substrate being adjacent to the first portion of the second substrate. The method includes removing the first anode from the second substrate, the first anode including the first layer of the anode active material and the first anode current collector. The method further includes disposing the first cathode to a first side of a first separator and disposing the first anode to a second side of the first separator such that at least a portion of the first separator separates the first cathode and the first anode.

In certain embodiments, a method includes forming a battery electrode on a substrate. Forming the battery electrode on the substrate includes depositing a first electrode active material layer on a first portion of a surface of the substrate and depositing, to form a current collector, a conductive material using a thin film deposition process on a surface of the first electrode active material layer. The conductive material is deposited over an edge of the first electrode active material layer and onto a second portion of the surface of the substrate, the second portion of the substrate being adjacent to the first portion of the substrate. The method includes removing the battery electrode from the substrate, the battery electrode including the first electrode active material layer and the current collector.

BRIEF DESCRIPTION OF THE DRAWINGS

For a more complete understanding of this disclosure, and the advantages thereof, reference is now made to the following descriptions taken in conjunction with the accompanying drawings, in which:

FIGS. 1A-1F each illustrate cross-sectional and plan views of an electrode workpiece during an example process for forming a battery electrode, according to certain embodiments;

DETAILED DESCRIPTION OF ILLUSTRATIVE EMBODIMENTS

FIGS. 1A-1F each illustrate cross-sectional and plan views of an electrode workpiece 100 during an example process 102 for forming a battery electrode, according to certain embodiments of this disclosure. In general, process 102 for forming a battery electrode includes depositing a first layer of an electrode active material on a first portion of a surface of a substrate; forming a current collector by depositing, using a thin film deposition process, a conductive material on a surface of the first layer of the electrode active material and on a second portion of the surface of the substrate, potentially depositing a second layer of the electrode active material on a portion of a surface of the current collector, and removing the formed battery electrode (including the first layer of the electrode active material, the current collector, and (if formed) the second layer of the electrode active material) from the substrate. One or more applications of heat may be performed during process 102 to facilitate drying of the electrode active material and removal of the formed battery electrode from the substrate.

Figure 1A:
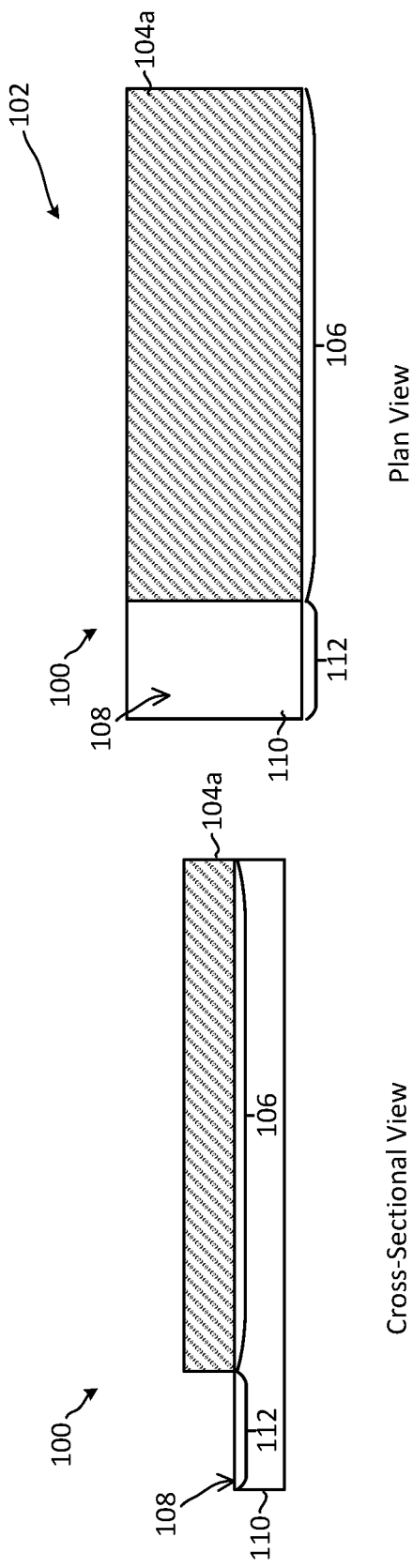

As illustrated in FIG. 1A, a first electrode active material layer 104a is deposited on a portion 106 of surface 108 of a substrate 110. A portion 112 of surface 108 of substrate 110 remains free of the electrode active material of first electrode active material layer 104a.

Substrate 110 may include any suitable type of substrate on which a battery electrode may be formed. In certain embodiments, surface 108 of substrate 110 has a dewetting condition relative to the electrode active material of first electrode active material layer 104a (and potentially to the conductive material of a to-be formed current collector, described below). The dewetting condition may be that substrate 110 is hydrophobic, oleophobic, or both, which may assist with removing first electrode active material layer 104a (and potentially the to-be formed current collector, described below), and thereby the formed battery electrode, from substrate 110 during subsequent processing. As just a few examples, substrate 110 may include a polytetrafluoroethylene (PTFE) material, a polyethylene material, a polyphenol material, or any of a number of other hydrophobic and/or oleophobic materials, particularly at surface 108 of substrate 110.

First electrode active material layer 104a may include the active material for either a positive electrode (e.g., a cathode) or a negative electrode (e.g., an anode) of a battery. To that end, depending on whether electrode workpiece 100 is being constructed into a cathode or anode, first electrode active material layer 104a also could be referred to as either a cathode active material layer or an anode active material layer, and the electrode active material of a cathode active material layer could be referred to as a cathode active material and the electrode active material of an anode active material layer could be referred to as an anode active material.

The electrode active material of first electrode active material layer 104a may include any material suitable for use as a cathode or an anode. In certain embodiments, the battery electrode being formed is to be used in a lithium-ion battery using a lithium-based chemistry. As just a few examples, for forming a cathode, the electrode active material of first electrode active material layer 104a may include a lithium oxide material (e.g., a lithium metal oxide), such as lithium cobalt oxide ($LiCoO_2$), lithium iron phosphate (LiFePO), lithium manganese oxide ($LiMn_2O_4$), lithium nickel oxide ($LiNiO_2$), or another suitable lithium oxide material. As just a few examples, for forming an anode, the electrode active material of first electrode active material layer 104a may include graphite, sodium, lithium, silicon, silicon oxide aluminum, tin, or the like. As just one particular example for a lithium-ion battery, the cathode active material may include a lithium oxide material while the anode active material may include graphite. In other embodiments, the battery may use chemistry such as a zinc-air, nickel-cadmium (NiCd), nickel-metal hydride (NiMH), lithium iron phosphate ($LiFePO_4$), lithium-ion polymer (Li-ion polymer/LiPo), or the like, with appropriate electrode active materials for first electrode active material layer 104a.

First electrode active material layer 104a may be deposited in any suitable manner. In certain embodiments, first electrode active material layer 104a may be coated or otherwise formed on portion 106 of substrate 110. As just a few examples, first electrode active material layer 104a may be deposited using a slot die coater, a doctor blade, or in any other suitable manner. In certain embodiments, first electrode active material layer 104a may be formed by chemical vapor deposition (CVD) (including, potentially, plasma enhanced CVD (PECVD)), physical vapor deposition (PVD), or another deposition process.

In an example cathode implementation, first electrode active material layer 104a may have an areal density of about 10 milligram per square centimeter ($mg/cm^2$) to about 20 $mg/cm^2$. In an example anode implementation, first electrode active material layer 104a may have an areal density of about 40 milligram per square centimeter ($mg/cm^2$) to about 80 $mg/cm^2$. In certain embodiments, first electrode active material layer 104a may be deposited to a thickness of about 30 micrometers (μm) to about 350 μm, potentially depending on the porosity and density of networks formed. In certain embodiments, some cathode materials, such as $LiCoO_2$ and the spinels, may be more lithium dense than anode materials (e.g., carbons) that may be used to allow sufficient charge/discharge. As another example, using pure lithium as an anode active material may allow active material layers as thin as a single atom. As another example, a current collector itself could act as the anode.

Although particular values are described, whether forming a cathode or an anode, this disclosure contemplates first electrode active material layer 104a having any suitable areal density and being deposited to any suitable thickness. The areal density and/or thickness of electrode active material layers may affect energy storage of a battery cell. To that end, to optimize electrode volume, electrode weight, and use of electrode active material, the areal density and/or thicknesses of the electrode active material layers for cathodes and anodes may be chosen so that the energy storage capabilities of the positive and negative electrodes substantially match.

In certain embodiments, the electrode active material of first electrode active material layer 104a includes an active component, a binding agent, and (during deposition) a solvent.

The active component may include the active element of the first electrode active material layer 104a. In the case of a cathode, the active component may include lithium oxide.

In the case of an anode, the active component may include graphite. The binding agent may act as an adhesive that helps the active material and potentially other components (e.g., a conductive additive) rest on substrate 110. In other words, the binding agent may help hold particles of the active component (and possibly a conductive additive) together to form first electrode active material layer 104a. As just one example, the binding agent may include polyvinylidene fluoride (PVDF). The binding agent may be inert. In certain embodiments, the components of the electrode active material of first electrode active material layer 104a are mixed using a solvent. The solvent may liquify the combination of these components for deposition. Example solvents include dimethyl sulfoxide (DMSO), ethanol, and the like. In certain embodiments, the electrode active material also includes a conductive additive, which may be a material added to increase conductivity of the battery electrode being formed. As an example, the conductive additive may be an organic material, such as carbon or carbon black. These components may be formed into a so-called slurry.

The components of the electrode active material of first electrode active material layer 104a may contribute to the capacity, energy, conductivity, and mechanical integrity of the battery electrode being formed. The various ratios of the components relative to one another may be selected to achieve an optimal combination of properties of the battery electrode. Moreover, the selection of solvent may affect which binding agents are suitable, and possibly whether additional additives are appropriate.

Although the electrode active material of first electrode active material layer 104a is described as including this particular content or taking this particular form or being deposited in particular manners, this disclosure contemplates the electrode active material of first electrode active material layer 104a including any suitable content and taking any suitable form and being deposited in any suitable manner, according to particular implementations. For example, although use of a solvent and formation into a slurry is described, the electrode active material of first electrode active material layer may be deposited using dry deposition techniques, if desired, and therefore the solvent may be omitted in such embodiments.

Figure 1B:
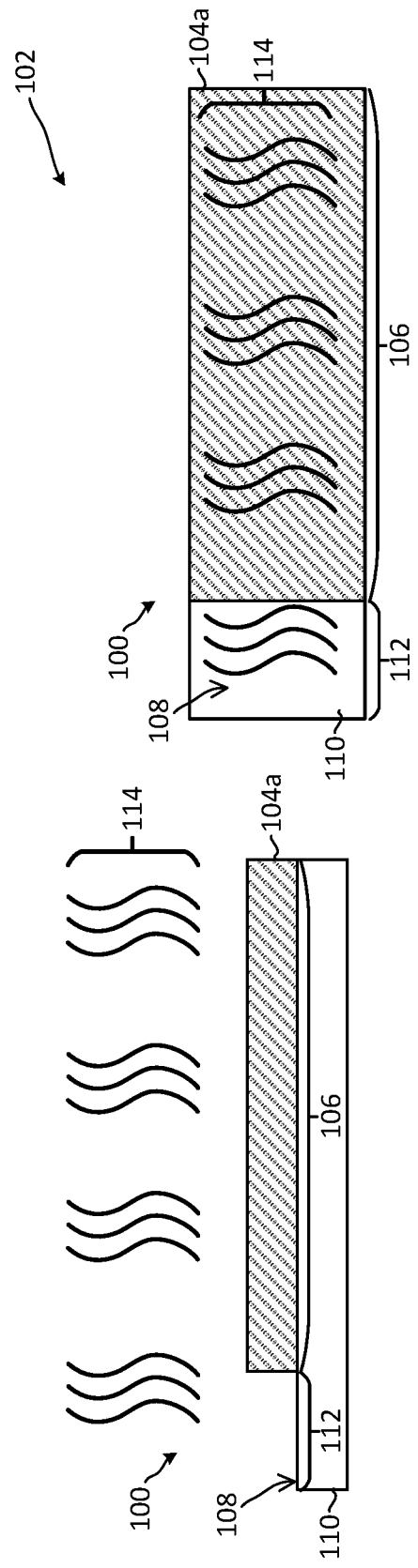

As illustrated in FIG. 1B, heat 114 may be applied to electrode workpiece 100. For example, electrode workpiece 100 may be baked at a suitable temperature. Applying heat 114 to electrode workpiece 100 may serve a variety of purposes.

For example, applying heat 114 to electrode workpiece 100 may dry the electrode active material of first electrode active material layer 104a. In embodiments in which the electrode active material of first electrode active material layer 104a includes a solvent, heating the electrode active material of first electrode active material layer 104a may include drying, or evaporating, the solvent, which in turn may dry the electrode active material of first electrode active material layer 104a.

As another example, applying heat 114 to electrode workpiece 100 may facilitate partially or wholly releasing electrode workpiece 100 from substrate 110. For example, due at least in part to the hydrophobic/oleophobic property of surface 108 of substrate 110, applying heat 114 to electrode workpiece 100 may cause electrode workpiece 100 to essentially float on surface 108 of substrate 110, which may assist with removing the formed battery electrode (including first electrode active material layer 104a and a to-be-formed current collector) from substrate 110 at a subsequent step of process 102.

The appropriate temperature for heat 114 and time of exposure of electrode workpiece 100 to heat 114 may be specific to the surface area of first electrode active material layer 104a and the electrode active material of first electrode active material layer 104a. In certain embodiments, heat 114 may be about 10° C. to about 30° C. above the boiling point of the solvent in the electrode active material of first electrode active material layer 104a, and electrode workpiece 100 may be exposed to heat 114 for about 20 minutes to about 40 minutes.

Although heat 114 is shown as being applied over electrode workpiece 100, this disclosure contemplates heat 114 being applied in any suitable direction or combination of directions. For example, heat 114 may be applied to substrate 110 and heat 114 may be applied over electrode workpiece 100. Heat 114 may be applied in an oven, such as a vacuum drying oven or other suitable type of oven, or using any other suitable device.

Figure 1C:
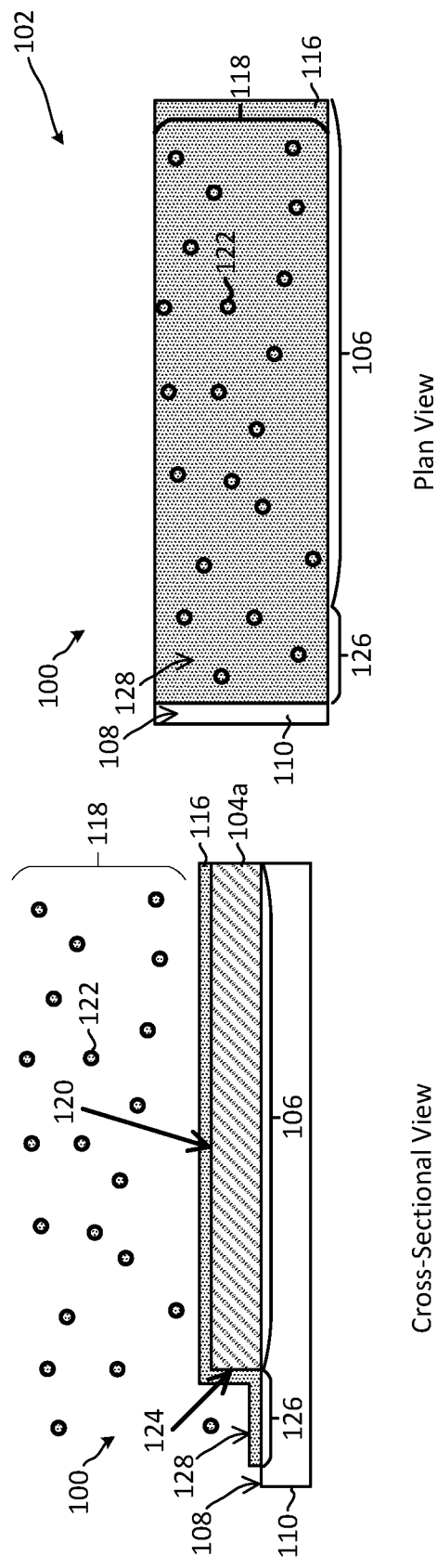

As illustrated in FIG. 1C, a current collector 116 may be formed on electrode workpiece 100. Current collector 116 includes a conductive material 118. Current collector 116 may be formed by depositing conductive material 118 on surface 120 of first electrode active material layer 104a. For example, particles 122 of conductive material 118 may be deposited on surface 120 of first electrode active material layer 104a to form current collector 116.

In certain embodiments, conductive material 118 is deposited over portions of electrode workpiece 100 such that current collector 116 extends over an edge of first electrode active material layer 104a. For example, conductive material 118 may be deposited along a sidewall surface 124 of first electrode active material layer 104a, and potentially on a portion 126 of surface 108 of substrate 110, such that the current collector 116 extends along sidewall surface 124 of first electrode active material layer 104a and along portion 126 of surface 108 of substrate 110. Portion 126 of surface 108 of substrate 110 may be adjacent to portion 106 of surface 108 of substrate 110. Furthermore, although portion 126 is shown to be only a portion of portion 112 (see, e.g., FIG. 1B) of substrate 110, conductive material 118 could be deposited to an edge of surface 108 of substrate 110, if desired. In certain embodiment, conductive material 118 is deposited as a generally conformal, uniform layer over surface 120 of first electrode active material layer 104a, sidewall surface 124 of first electrode active material layer 104a, and portion 126 of surface 108 of substrate 110.

To form current collector 116, conductive material 118 may be deposited using any suitable thin film deposition process. A thin film deposition process may include a technique for creating and depositing thin film coatings onto a substrate material. For example, conductive material 118 may be deposited using a PVD process (e.g., a sputter deposition process), a CVD process, or another suitable type of thin film deposition process for depositing particles 122 of conductive material 118 on surface 120 of first electrode active material layer 104a, and potentially over an edge of first electrode active material layer 104a and onto portion 126 of surface 108 of substrate 110 and/or along sidewall surface 124 of first electrode active material layer 104a.

For example, a PVD process, and particularly a sputter deposition process, may include positioning substrate 110, on which first electrode active material layer 104a has been deposited, in a vacuum chamber with a target layer of conductive material 118 positioned opposite substrate 110. High energy particles of a suitable gas may be directed at the target layer, causing particles of the target layer to disengage from the target layer and move toward substrate 110 for depositing on surface 120 of first electrode active material layer 104a, as well as over an edge (edge 140, labeled in FIG. 1F) of first electrode active material layer 104a on sidewall surface 124 of first electrode active material layer 104a and on portion 126 of surface 108 of substrate 110. Example PVD processes include sputtering (e.g., magnetron (DC or RF) sputtering, ion beam sputtering, and the like), evaporation (e.g., electronic beam (e-beam) evaporation, ion-assisted deposition, thermal evaporation, and the like), cathodic arc vapor deposition, pulsed laser deposition, and the like.

As another example, a CVD process may include positioning substrate 110, on which first electrode active material layer 104a has been deposited, in a vacuum chamber, and heating one or more volatile precursors, causing the one or more precursors for vaporize. When the vaporized precursor(s) interact with the substrate surface (that is the surface(s) on which deposition is desired), a chemical reaction occurs leaving a chemically-deposited coating. Example CVD processes include PECVD, atmospheric pressure CVD, low-pressure CVD, ultra-high vacuum CVD, atomic layer deposition, and the like.

In certain embodiments, if the battery electrode being formed using process 102 is a cathode, current collector 116 may be deposited using a PVD process (e.g., a sputter deposition process). In certain embodiments, if the battery electrode being formed using process 102 is an anode, current collector 116 may be deposited using a PVD process (e.g., a sputter deposition process) or a CVD process. That is, in certain embodiments, the materials suitable for use as a cathode and its associated current collector 116 may permit deposition via a PVD process (e.g., a sputter deposition process), while the materials suitable for use as an anode and its associated current collector 116 may permit deposition via a PVD process (e.g., a sputter deposition process) or a CVD deposition process. Additional details of an example process for sputter deposition are illustrated and described below with reference to FIG. 3.

In one example, conductive material 118 may be aluminum and current collector 116 may be deposited using DC sputtering, e-beam evaporation, or cathodic arc vaporization. Taking a cathodic arc vaporization technique as an example, in certain embodiments, polarizations of about 20 V to about 60 V and current levels less than about 50 A may be used. In certain embodiments, a boron nitride or other suitable crucible may be used for a thermal evaporation process, and it may be desirable to maintain the active material on which the current collector 116 is being deposited (e.g., first electrode active material layer 104a) on a relatively cooler surface (e.g., about 50° C. to about 80° C.) to reduce or eliminate rapid binder decomposition. In another example, conductive material 118 may be copper and current collector 116 may be deposited using DC sputtering.

It should be understood that these techniques are provided as examples only, and this disclosure contemplates using any suitable thin film deposition technique for depositing any suitable type of conductive material 118. In certain embodiments, the conductive material 118 of current collector 116 may be deposited according to guidance from the supplier of the conductive material 118 and/or the equipment used for performing the thin film deposition. As just one particular example, manufacturers such as the KURT J. LESKER COMPANY, AMERICAN VACUUM, VACUUM TECHNOLOGY INCORPORATED, VACUUM INSTRUMENTS, and the like may provide guidance as to suitable thin film deposition conditions and parameters for conductive materials, that may be suitable for depositing conductive material 118 of current collector 116 according to certain embodiments.

In certain embodiments, a portion of current collector 116 that is deposited on portion 126 of surface 108 of substrate 110 may be referred to as contact portion 128. When positioned in a battery structure, contact portion 128 may be used to connect the battery electrode being formed using process 102 to other conductive elements of the battery structure. For example, contact portion 128 may be used to connect, directly or indirectly, the battery electrode being formed to other appropriate battery electrodes (e.g., cathodes to cathodes or anodes to anodes) of the battery structure and/or to a battery terminal of an appropriate polarity (positive or negative).

Current collectors 116 are formed of conductive material 118 to facilitate movement of current or electrons out of a battery structure that incorporates the battery electrode being formed. Current collector 116 may be formed of any suitable type of conductive material 118. For example, conductive material 118 of current collector 116 may include copper, aluminum, gold, a metallic alloy, or another conductive material. In certain embodiments, the type of conductive material 118 for a current collector 116 may depend on a type of battery electrode (e.g., cathode or anode) being formed using process 102. That is, in certain embodiments, a current collector 116 for a cathode may include a different conductive material 118 than a current collector 116 for an anode. For example, conductive material 118 for a current collector 116 of a cathode may be aluminum, while conductive material 118 for a current collector 116 of an anode may be copper.

In certain embodiments, using a thin film deposition technique may allow current collector 116 to be deposited to as thin as a monolayer. As a particular example that may be suitable for reliable operation of a battery electrode in a battery, current collector 116 may be deposited to a thickness of about 5 μm to about 40 μm. As a more particular example, current collector 116 may have a thickness of about 20 μm or less. Although particular values are described, this disclosure contemplates current collector 116 being deposited to any suitable thickness.

Figure 1D:
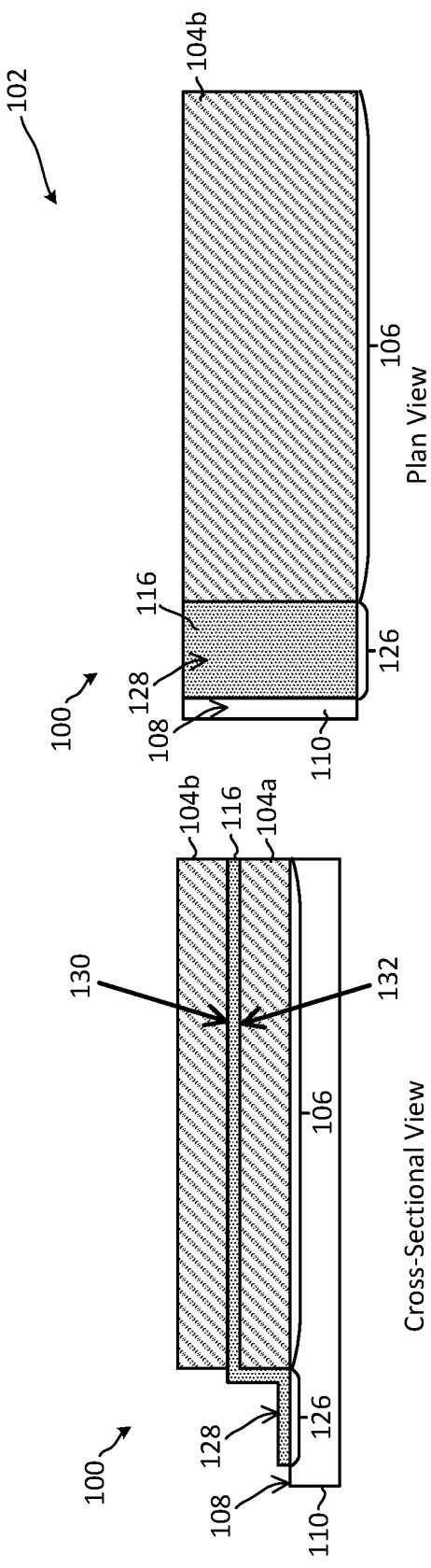

As illustrated in FIG. 1D, a second electrode active material layer 104b may be deposited on at least a portion of a surface 130 of current collector 116. Some or all of contact portion 128 of current collector 116 may remain free of the electrode active material of second electrode active material layer 104b. Although first electrode active material layer 104 and second electrode active material layer 104b are shown to be largely aligned vertically, first electrode active material layer 104 and second electrode active material layer 104b might or might not be aligned vertically.

In certain embodiments, the electrode active material of second electrode active material layer 104b is the same as the electrode active material of first electrode active material layer 104a.

Second electrode active material layer 104b may be deposited in any suitable manner. In certain embodiments, second electrode active material layer 104b is deposited in a similar manner to a manner in which first electrode active material layer 104a was deposited. In other embodiments, second electrode active material layer 104b is deposited in a different manner than the manner in which first electrode active material layer 104a was deposited.

In this example, surface 130 of current collector 116 contacts second electrode active material layer 104b and an opposing surface 132 of current collector 116 contacts first electrode active material layer 104a.

In an example cathode implementation, second electrode active material layer 104b may have an areal density of about 10 milligram per square centimeter ($mg/cm^2$) to about 20 $mg/cm^2$. In an example anode implementation, second electrode active material layer 104b may have an areal density of about 40 milligram per square centimeter ($mg/cm^2$) to about 80 $mg/cm^2$. In certain embodiments, second electrode active material layer 104b may be deposited to a thickness of about 30 μm to about 350 μm, potentially depending on the porosity and density of networks formed. In certain embodiments, some cathode materials, such as $LiCoO_2$ and the spinels, may be more lithium dense than anode materials (e.g., carbons) that may be used to allow sufficient charge/discharge. As another example, using pure lithium as an anode active material may allow active material layers as thin as a single atom. As another example, a current collector itself could act as the anode.

Although particular values are described, whether forming a cathode or an anode, this disclosure contemplates second electrode active material layer 104b having any suitable areal density and being deposited to any suitable thickness. The areal density and/or thickness of electrode active material layers may affect energy storage of a battery cell. To that end, to optimize electrode volume, electrode weight, and use of electrode active material, the areal density and/or thicknesses of the electrode active material layers for cathodes and anodes may be chosen so that the energy storage capabilities of the positive and negative electrodes substantially match.

As illustrated in FIG. 1E, heat 134 may be applied to electrode workpiece 100. In certain embodiments, application of heat 134 is similar to application of heat 114. Again, applying heat 134 to electrode workpiece 100 may serve a variety of purposes.

For example, applying heat 134 to electrode workpiece 100 may dry the electrode active material of second electrode active material layer 104b. In embodiments in which the electrode active material of second electrode active material layer 104b includes a solvent, heating the electrode active material of second electrode active material layer 104b may include drying the solvent, which in turn may dry the electrode active material. In certain embodiments, heat 134 may be applied, at least in part, by baking electrode workpiece 100.

As another example, applying heat 134 to electrode workpiece 100 may facilitate partially or wholly releasing current collector 116, and particularly contact portion 128 of current collector 116, from substrate 110. For example, due at least in part to the hydrophobic/oleophobic property of surface 108 of substrate 110, drying electrode workpiece 100 may cause electrode workpiece 100 (which now includes current collector 116, a portion of which contacts surface 108 of substrate 110) to essentially float on surface 108 of substrate 110, which may assist with removing the formed electrode from substrate 110 at a subsequent step of process 102.

The appropriate temperature for heat 134 and time of exposure of electrode workpiece 100 to heat 134 may be specific to the surface area of second electrode active material layer 104b, the electrode active material of second electrode active material layer 104b, the surface area of any uncovered current collector 116 (e.g., including contact portion 128), and conductive material 118. In certain embodiments, heat 134 may be about 10° C. to about 30° C. above the boiling point of the solvent in the electrode active material of second electrode active material layer 104b, and electrode workpiece 100 may be exposed to heat 134 for about 20 minutes to about 40 minutes.

Although heat 134 is shown as being applied over electrode workpiece 100, this disclosure contemplates heat 134 as being applied in any suitable direction or combination of directions. For example, heat 134 may be applied to substrate 110 and heat 134 may be applied over electrode workpiece 100. Heat 134 may be applied in an oven, such as a vacuum drying oven or other suitable type of oven, or using any other suitable device.

At this state, the combination of first electrode active material layer 104a, current collector 116, and second electrode active material layer 104b may be considered a battery electrode, referenced below as battery electrode 136 (see, e.g., FIG. 1F).

As illustrated in FIG. 1F, battery electrode 136 has been removed from substrate 110. In this example, battery electrode 136 includes first electrode active material layer 104a, current collector 116, and second electrode active material layer 104b. In certain embodiments, contact portion 128 of current collector 116 extends in a direction 138 beyond edge 140 of first electrode active material layer 104a and in the first direction beyond edge 142 of second electrode active material layer 104b. In other words, contact portion 128 of current collector may be exposed current collector 116 that is free electrode active material so that battery electrode 136 may be electrically connected to other conductive elements of a battery structure.

Battery electrode 136 may be removed from substrate 110 in any suitable manner, such as by lifting using a suitable tool or machine. In certain embodiments, the heating of electrode workpiece 100, as described above with reference to FIGS. 1B and 1E, may facilitate removal of battery electrode 136 from substrate 110 by activating or otherwise promoting the dewetting property of substrate 110 relative to conductive material 118 of current collector 116 and/or the electrode active material of first electrode active material layer 104a.

In certain embodiments, as can be seen in the plan view of FIG. 1F, contact portion 128 of current collector 116 extends substantially an entire width 144 of battery electrode 136, which may provide for more linear current flow along length of battery electrodes 136. In other embodiments, contact portion 128 of current collector 116 extends less than width 144 of battery electrode 136.

Although process 102 is described with two layers of electrode active material being formed on both surface 130 and surface 132 of current collector 116 (first electrode active material layer 104a and second electrode active material layer 104b), this disclosure contemplates forming any suitable number of electrode active material layers 104. For example, this disclosure contemplates forming only first electrode active material layer 104a. In such an example, the formed battery electrode may be the first electrode active material layer 104a and current collector 116 formed in FIG. 1C, and the structure formed in FIG. 1C may be removed from substrate 110 without forming second electrode active material layer 104b. As another example, even in embodiments in which electrode active material layers 104 are to be formed on both surface 130 and surface 132 of current collector 116 (first electrode active material layer 104a and second electrode active material layer 104b), the first electrode active material layer 104a and current collector 116 formed in FIG. 1C may be removed from substrate 110 following the state shown in FIG. 1C, and second electrode active material layer 104b, may be applied to surface 130 of current collector 116 following such removal in a suitable manner.

As described above, the battery electrode (e.g., battery electrode 136) being formed using process 102 may be a cathode or an anode. Typically, preventing cross-contamination of the materials used for forming cathodes and the materials used for forming anodes is desirable to avoid potentially compromising the operation of a battery that incorporates the cathodes and anodes. In certain implementations, cathodes and anodes are formed in isolated (from each other) portions of a battery manufacturing facility to avoid such cross-contamination. Thus, process 102 could be performed for forming cathodes on a first substrate 110 (or set of first substrates 110), and process 102 could be performed for forming anodes on a different second substrate 110 (or set of second substrates 110). Of course, process 102 could be repeated numerous times for forming multiple cathodes and anodes.

Additionally, although a single battery electrode 136 has been referenced in describing process 102, this disclosure contemplates the materials deposited on substrate 110, and substrate 110 having a large enough area to accommodate, forming multiple battery electrodes 136 in an electrode sheet and then subsequently cutting the formed electrode sheet into separate battery electrodes 136. An example of such an electrode sheet and associated cutting is described below with reference to FIG. 2.

Figure 2:
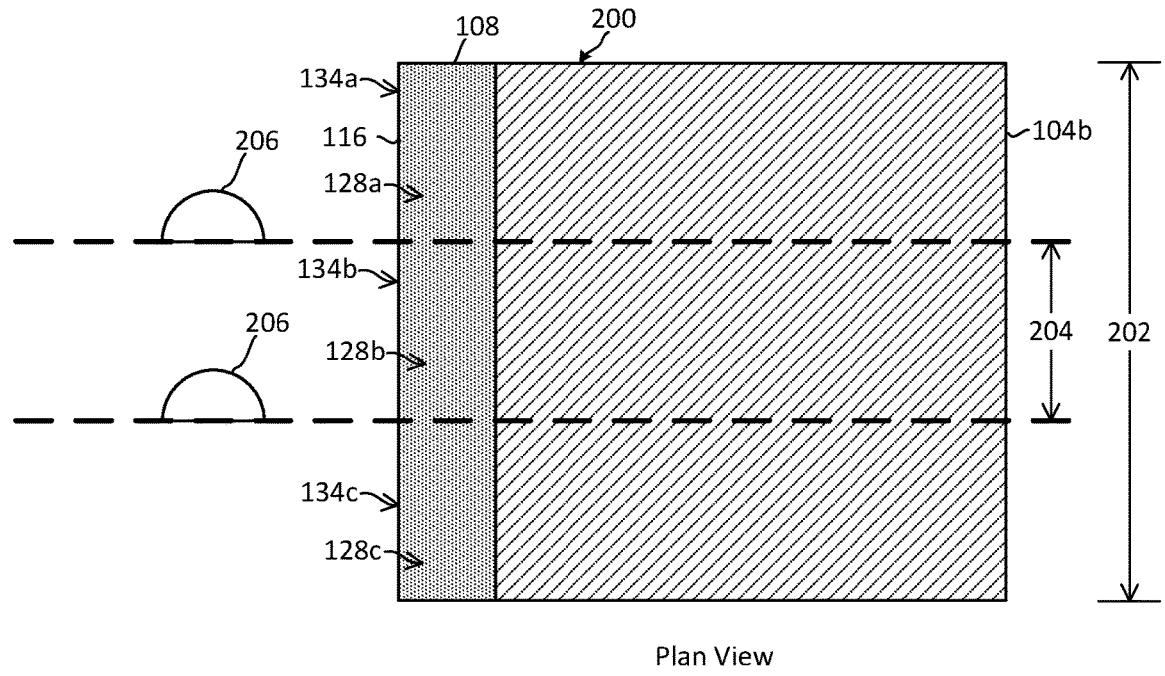
FIG. 2 illustrates an example electrode sheet in the process of being cut to form a plurality of battery electrodes, according to certain embodiments.

FIG. 2 illustrates an example electrode sheet 200 in the process of being cut to form a plurality of battery electrodes 136a-136c, according to certain embodiments. Electrode sheet 200 may be formed using process 102. In other words, although FIGS. 1A-1F are described with reference to forming a single battery electrode 136, the formed battery electrode 136, as removed from substrate 110, may be formed as part of an electrode sheet 200 of sufficient dimensions to then be cut into a plurality of battery electrodes 136a-136c.

Electrode sheet 200 may have a width 202. Depending on width 202 of electrode sheet 200 and an electrode width 204 (one of which is marked in FIG. 2), a suitable number of blades 206 may be used to cut electrode sheet 200 into a particular number of electrodes. Although described as blades, blades 206 may take any form suitable for cutting electrode sheet 200. This cutting process may be referred to as "slitting."

Figure 3:
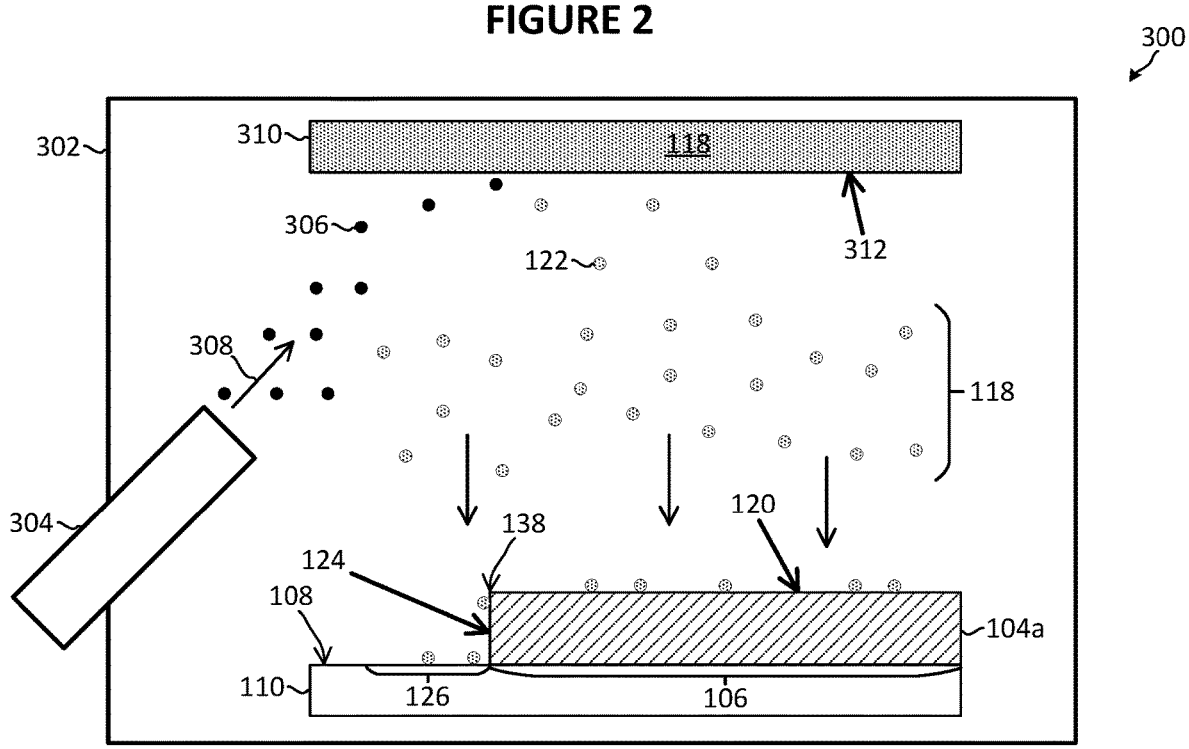
FIG. 3 illustrates an example sputtering process for forming a current collector on a layer of battery electrode active material, according to certain embodiments.

FIG. 3 illustrates an example sputtering process 300 for forming a current collector 116 on a layer of battery electrode active material, according to certain embodiments. In particular, FIG. 3 illustrates using sputtering process 300 to form current collector 116 on surface 120 of first electrode active material layer 104a, as well as over an edge 140 of first electrode active material layer 104a such that current collector 116 is formed on sidewall surface 124 of first electrode active material layer 104a and on portion 126 of surface 108 of substrate 110.

Substrate 110, on which first electrode active material layer 104a has been disposed, may be positioned in a deposition chamber 302 of a deposition tool. Deposition chamber 302 may be a vacuum chamber. A gas inlet 304 may be fed a substance 306 and may eject particles of substance 306 in a high-energy state in a direction 308 toward target layer 310, positioned inside deposition chamber 302. Target layer 310 may include conductive material 118, which is to be deposited on surface 120 of first electrode active material layer 104a, as well as over edge 140 of first electrode active material layer 104a on sidewall surface 124 of first electrode active material layer 104a and on portion 126 of surface 108 of substrate 110.

As particles of substance 306 collide with a surface 312 of target layer 310, particles 122 of conductive material 118 may disengage from surface 312 of target layer 310. At least some of particles 122 of conductive material 118 that have disengaged from surface 312 of target layer 310 may move toward and be deposited on surface 120 and sidewall surface 124 of first electrode active material layer 104a and portion 126 of surface 108 of substrate 110, resulting in formation of current collector 116 (see, e.g., FIG. 1C).

The selection of substance 306 may be determined, at least in part, based on conductive material 118 of target layer 310. In certain embodiments, an appropriate substance 306 is argon (Ar); however, any appropriate substance 306 may be used. As described above, conductive material 118 of target layer 310 may be aluminum, copper, or any other conductive material suitable for use as a current collector 116 for the type of battery electrode being formed.

Figure 4:
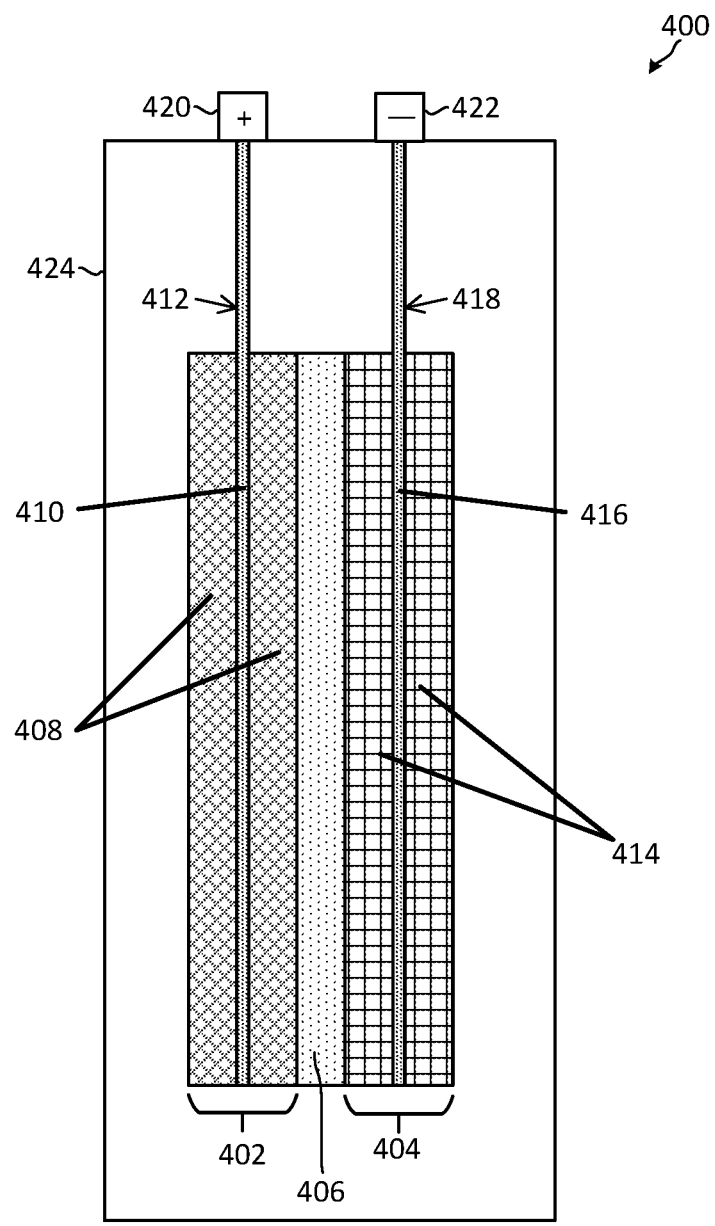
FIG. 4 illustrates an example battery structure having a single cathode-anode pair, according to certain embodiments.

FIG. 4 illustrates an example battery structure 400 having a single cathode-anode pair, according to certain embodiments. Battery structure 400 may be a complete battery or a battery cell that is part of a larger battery, for example. In the illustrated example, battery structure 400 includes a cathode 402 and an anode 404. Cathode 402, anode 404, or both may be constructed using process 102 described above with reference to FIGS. 1A-1F. For example, cathode 402 may represent an instance of process 102 in which the formed battery electrode 136 of FIG. 1F is a cathode, and anode 404 may represent an instance of process 102 in which the formed battery electrode 136 of FIG. 1F is an anode.

In constructing battery structure 400, cathode 402 is disposed to a first side of a separator 406, and anode 404 is disposed to a second side of separator 406. Separator 406 electrically insulates cathode 402 from anode 404 and provides ion exchange between cathode 402 and anode 404 in battery structure 400. Separator 406 may be, in part, a film or other structure formed from a polymer, such as a polyolefin, polyethylene, polypropylene, or another suitable material.

For cathode 402, cathode active material layers 408 are disposed on opposing sides of a cathode current collector 410. Cathode active material layers 408 are analogous to electrode active material layers 104a and 104b of FIGS. 1A-1F, and cathode current collector 410 is analogous to current collector 116 of FIGS. 1C-1F. Furthermore, cathode current collector 410 includes contact portion 412, which extends from ends of cathode active material layers 408 and is analogous to contact portion 128 of battery electrode 136 (see, e.g., FIG. 1F).

Similarly, for anode 404, anode active material layers 414 are disposed on opposing sides of an anode current collector 416. Anode active material layers 414 are analogous to electrode active material layers 104a and 104b of FIGS. 1A-1F, and anode current collector 416 is analogous to current collector 116 of FIGS. 1C-1F. Furthermore, anode current collector 416 includes contact portion 418, which extends from ends of anode active material layers 414 and is analogous to contact portion 128 of battery electrode 136 (see, e.g., FIG. 1F).

In the illustrated example, contact portion 412 of cathode current collector 410 is coupled to a first battery terminal 420 of a first polarity (e.g., positive), and contact portion 418 of anode current collector 416 is coupled to a second battery terminal 422 of an opposite second polarity (e.g., negative). Contact portions 412 and 418 may be coupled to battery terminals 420 and 422, respectively, directly or via any suitable intervening conductive structures. Furthermore, although contact portions 412 and 418 are shown to extend from ends of cathode 402 and anode 404, respectively, that face the same direction, contact portion 412 of cathode current collector 410 could extend from cathode 402 in a first direction, while contact portion 418 of anode current collector 416 could extend from anode 404 in a different (and not necessarily opposite) direction.

Battery structure 400 may include a casing 424 that encases components of battery structure 400, and may be provided to protect and insulate the internal components of battery structure 400. Battery terminals 420 and 422 may be positioned, at least partially, external to casing 424 and/or may be at least partially integral to casing 424. Furthermore, while first battery terminal 420 and second battery terminal 422 are shown to be positioned on a particular surface and on a same surface of casing 424, this disclosure contemplates other arrangements.

Casing 424 may be formed of an insulating material, polymer, shrink wrap, or the like. Casing 424 may be hard or soft, and which is appropriate may depend on a form factor of battery structure 400. For example, battery structure 400 may take any suitable form factor, such as a cylindrical form factor, a prismatic form factor, or a pouch form factor. In certain embodiments, a hard casing 424 may be used for a cylindrical or prismatic form factor, while a soft casing 424 may be used for a pouch form factor.

An electrolyte may be provided to facilitate ion exchange between the cathode 402 and anode 404 through the separator 406. Casing 424 may be provided, in part, to enclose the electrolyte. In some embodiments, the electrolyte may be a gel or liquid material such as a polymer gel comprising lithium ion complexes such as ethylene carbonate, diethyl carbonate or the like and a non-coordinating anion salts such as lithium hexafluorophosphate ($LiPF_6$), lithium hexafluoroarsenate monohydrate ($LiAsF_6$), lithium perchlorate ($LiClO_4$), lithium tetrafluoroborate ($LiBF_4$), and lithium triflate ($LiCF_3SO_3$) or the like. In other embodiments, the electrolyte may be a solid electrolyte or an aqueous electrolyte.

Figure 5:
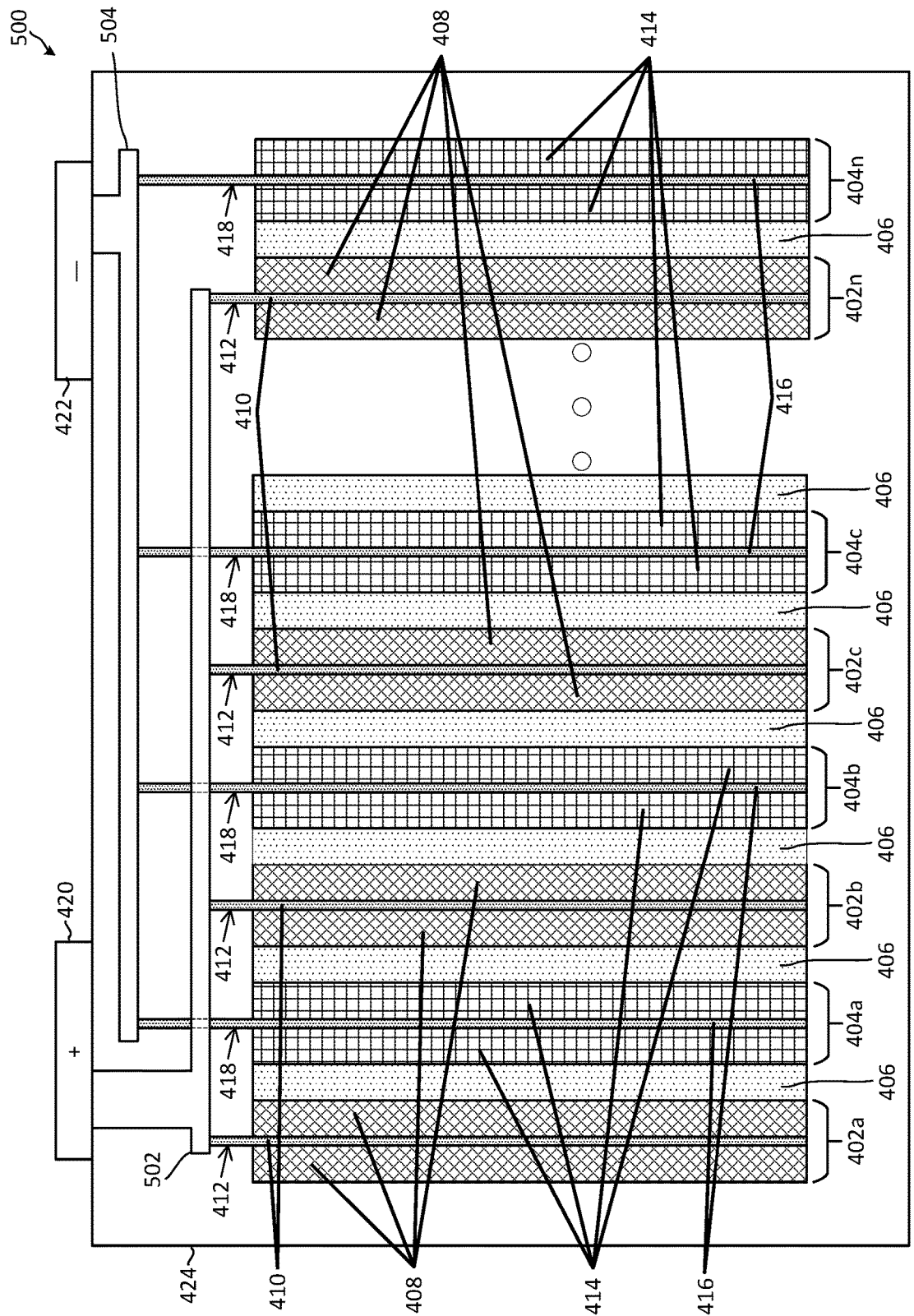
FIG. 5 illustrates an example battery structure having multiple cathodes and anodes, according to certain embodiments.

FIG. 5 illustrates an example battery structure 500 having multiple cathode 402 and multiple anodes 404, according to certain embodiments. In the illustrated example, battery structure 500 includes cathodes 402a-402n and anodes 404a-404n in an alternating, potentially stacked, arrangement, so each cathode 402 is adjacent to an anode 404, but separated by separator 406. Similarly, each anode 404 is adjacent to a cathode 402, and separated by separator 406. Thus, each cathode 402 is separated from any adjacent anode 404 by a separator 406, and each anode 404 is separated from any adjacent cathode 402 by a separator 406.

Separator 406 may be a continuous layer provided throughout battery structure 500, arranged in a folding, "accordion" manner between cathodes 402 and anodes 404, or may be discontinuous with distinct layers of separator 406 provided between cathodes 402 and anodes 404. In other embodiments, the separator 406 may be rolled into a spiral.

Cathodes 402 include cathode current collectors 410, and anodes include anode current collectors 416. Cathode current collectors 410 include contact portions 412, and anode current collectors 416 include contact portions 418. Contact portions 412 of cathode current collectors 410 and contact portions 412 of anode current collectors 416 extend, in this example, past edges of separator 406.

In general, like-numbered elements of battery structure 500 of FIG. 5 and battery structure 400 of FIG. 4 share certain features in common, and thus the description of those elements is not repeated with reference to FIG. 5.

Battery structure 500 includes cathode connection structure 502 and anode connection structure 504. Cathode connection structure 502 provides a conductive path to battery terminal 420 having a first polarity (e.g., positive), and anode connection structure 504 provides a conductive path to battery terminal 422 having a second polarity (e.g., negative). For example, contact portions 412 of cathode current collectors 410 may be coupled to cathode connection structure 502 to provide current flow to/from battery terminal 420, and contact portions 418 of anode current collectors 416 may be coupled to anode connection structure 504 to provide current flow to/from battery terminal 422.

In certain embodiments, each contact portion 412/418 is individually attached to an appropriate connection structure 502/504, and may be attached to the appropriate connection structure 502/504 by crimping, spot welding, soldering, ultrasonic welding, using a connector such as a rivet, bolt, screw, adhesive, or the like. In some embodiments, the contact portion 412/418 may be bent, and the bent portion may be attached to the appropriate connection structure 502/504. Connection structures 502/504 may, in certain embodiments, be a conductive material.

In certain embodiments, some or all of contact portions 412 of cathode current collectors 410 may be coupled together prior to coupling to cathode connection structure 502 and then coupled to cathode connection structure 502 as a group. For example, some or all of contact portions 412 of cathode current collectors 410 may be bonded to each other, and then bonded to, or placed in contact with, cathode connection structure 502. The contact portions 412 may be attached to each other by crimping, spot welding, soldering, ultrasonic welding, using a connector such as a rivet, bolt, screw, adhesive, or the like, and then may be attached to cathode connection structure 502 using a similar or different process for providing electrical conductivity between the contact portions 412 and cathode connection structure 502.

In certain embodiments, some or all of contact portions 418 of anode current collectors 416 may be coupled together prior to coupling to anode connection structure 504 and then coupled to anode connection structure 504 as a group. For example, some or all of contact portions 418 of anode current collectors 416 may be bonded to each other, and then bonded to, or placed in contact with, anode connection structure 504. The contact portions 418 may be attached to each other by crimping, spot welding, soldering, ultrasonic welding, using a connector such as a rivet, bolt, screw, adhesive, or the like, and then may be attached to anode connection structure 504 using a similar or different process for providing electrical conductivity between the contact portions 418 and anode connection structure 504.

While contact portions 412, 418 in FIGS. 4 and 5 are shown to be relatively large in comparison to the rest of the battery structures 400, 500, contact portions 412, 418 may be sized according to the requirements for connecting contact portions 412, 418 to each other or to connection structures 502, 504. After bonding or electrical connection to each other or to a connection structure 502, 504, contact portions 412, 418 act as a positive terminal or a negative terminal. In certain embodiments, contact portions 412, 418 may extend past the edges of the separators 406 by a distance of about 1 mm, and in other embodiments, different lengths may be used. Additionally, some of or all contact portions 412, 418 may have a different lengths.

In another embodiment, one or more of cathode connection structure 502 or anode connection structure 504 may be omitted and contact portions 412/418 may be coupled directly to an appropriate battery terminal 420 or 422.

As with battery structure 400 of FIG. 4, battery structure 500 may include casing 424. Furthermore, as with battery structure 400 of FIG. 4, an electrolyte may be provided in battery structure 500 to facilitate ion exchange between the cathode 402 and anode 404 through the separator 406. The description of such an electrolyte provided with reference to battery structure 400 is incorporated by reference into this description of battery structure 500.

Figure 6:
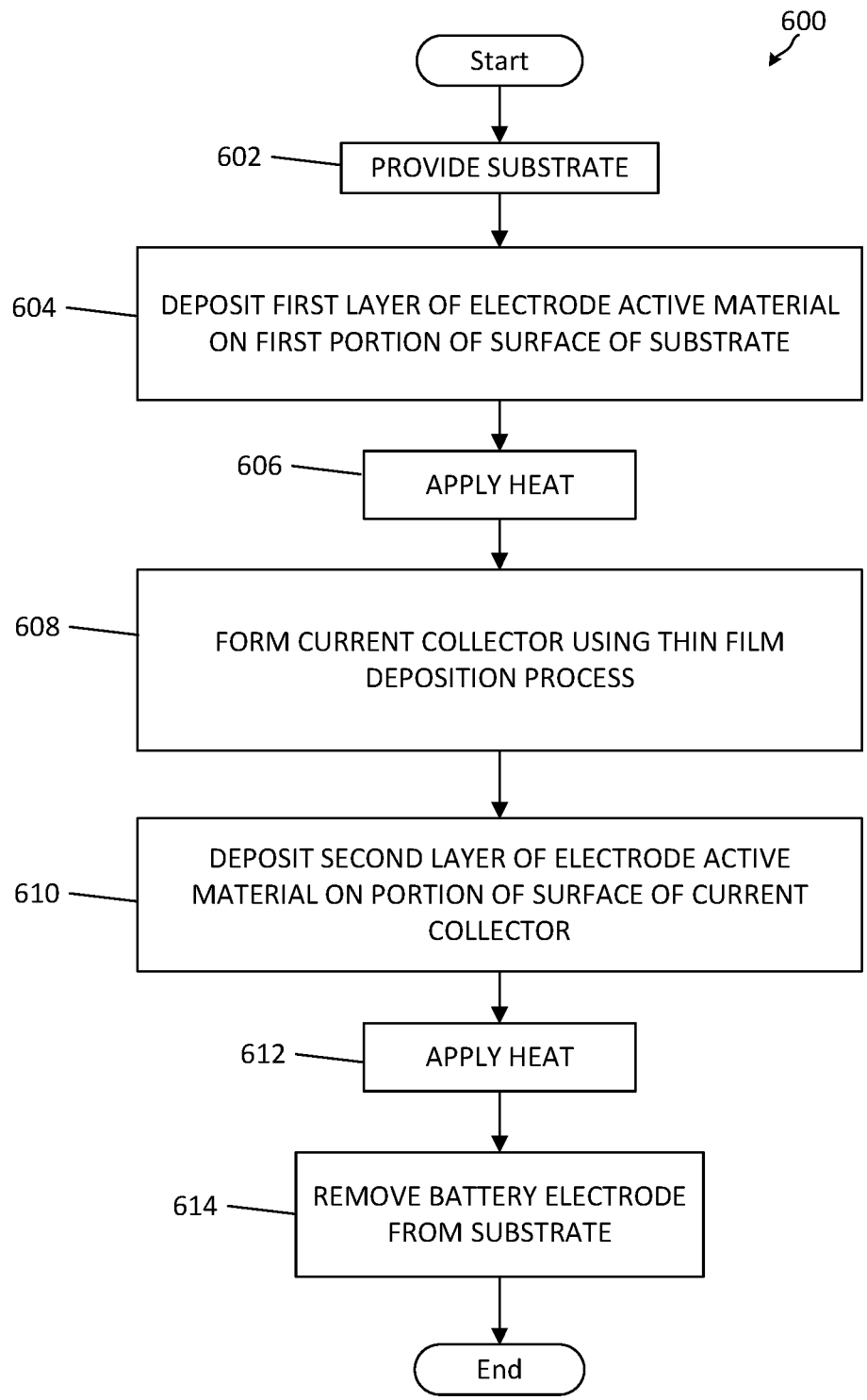
FIG. 6 illustrates an example method for forming a battery electrode, according to certain embodiments.

FIG. 6 illustrates an example method 600 for forming a battery electrode, according to certain embodiments. In certain embodiments, method 600 is generally analogous to process 102. At block 602, a substrate 110 is provided. Surface 108 of substrate 110 may have a dewetting condition relative to a to-be-deposited electrode active material and/or conductive material of a current collector. For example, surface 108 of substrate 110 may be hydrophobic and/or oleophobic.

At blocks 604-612, one or more battery electrodes 136 may be formed on substrate 110. In certain embodiments, a single battery electrode 136 is formed on substrate 110. In other embodiments, as removed from substrate 110, battery electrode 136 is part of an electrode sheet 200, and method 600 further includes cutting electrode sheet 200 to form multiple battery electrodes 136.

At block 604, a first electrode active material layer 104*a* is deposited on a portion 106 of surface 108 of substrate 110. In certain embodiments, the battery electrode 136 being formed is a cathode, and the electrode active material of first electrode active material layer 104*a* is a material suitable for use as a cathode. As just one example, a material suitable for use as a cathode may include lithium oxide. In certain embodiments, the battery electrode 136 being formed is an anode, and the electrode active material of first electrode active material layer 104*a* is a material suitable for use as an anode. As just one example, a material suitable for use as an anode may include graphite. In certain embodiments, during deposition, the electrode active material of first electrode active material layer 104*a* includes an active component, a binding agent, and a solvent.

At block 606, substrate 110 and first electrode active material layer 104*a* may be heated by applying heat 114. This heating, which may be performed by baking or otherwise applying heat 114 to substrate 110 and first electrode active material layer 104*a*, may dry the electrode active material of first electrode active material layer 104*a*. For example, in embodiments in which the electrode active material of first electrode active material layer 104*a* includes (during deposition) a solvent, heating the electrode active material may dry the solvent, thereby drying first electrode active material layer 104*a*. This heating also may facilitate partially or wholly releasing first electrode active material layer 104*a* from substrate 110, which may assist with subsequently removing the formed battery electrode from substrate 110.

At block 608, a current collector 116 that includes a conductive material 118 may be formed using a thin film deposition process. For example, forming current collector 116 may include depositing, using a thin film deposition process, conductive material 118 on surface 120 of first electrode active material layer 104*a*. In certain embodiments, conductive material 118 is deposited over edge 140 of first electrode active material layer 104*a* and onto sidewall surface 124 of first electrode active material layer 104*a* and onto portion 126 of surface 108 of substrate 110. In certain embodiments, current collector 116 has a thickness of about 5 μm to about 40 μm.

The thin film deposition process may include a PVD process (e.g., a sputter deposition process), a CVD process (including, possibly, a PECVD process), or another suitable thin film deposition process. In certain embodiments, when forming a cathode, current collector 116 may be formed by depositing conductive material 118 using a PVD deposition process. In certain embodiments, when forming an anode, current collector 116 may be formed by depositing conductive material 118 using a PVD deposition process or a CVD process.

In one example, forming current collector 116 includes depositing, using a sputter deposition process, conductive material 118 on surface 120 of first electrode active material layer 104*a*, and potentially over edge 140 of first electrode active material layer 104*a* and onto sidewall surface 124 of first electrode active material layer 104*a* and onto portion 126 of surface 108 of substrate 110. In certain embodiments, the sputter deposition process includes directing a substance 306 at a target layer 310 to cause particles 122 of target layer 310 to disengage from target layer 310 and be deposited onto surface 120 of first electrode active material layer 104*a*, and potentially onto sidewall surface 124 of first electrode active material layer 104*a* and onto portion 126 of surface 108 of substrate 110. Target layer 310 may include conductive material 118.

At block 610, after forming current collector 116 and before removing battery electrode 136 from substrate 110, a second electrode active material layer 104*b* may be deposited on at least a portion of surface 130 of current collector 116. Surface 130 of current collector 116 may contact second electrode active material layer 104*b*, and surface 132 of current collector 116 may contact first electrode active material layer 104*a*. Second electrode active material layer 104*b* may include the same electrode active material as was included in first electrode active material layer 104*a*.

At block 612, substrate 110, first electrode active material layer 104*a*, current collector 116, and second electrode active material layer 104*b* may be heated by applying heat 134. This heating, which may be performed by baking or otherwise applying heat 134 to substrate 110, first electrode active material layer 104*a*, current collector 116, and second electrode active material layer 104*b*, may dry the electrode active material of second electrode active material layer 104*b*. For example, in embodiments in which the electrode active material of second electrode active material layer 104*b* includes (during deposition) a solvent, heating the electrode active material may dry the solvent, thereby drying second electrode active material layer 104*b*. This heating also may facilitate partially or wholly releasing from substrate 110 the portion of current collector 116 that contacts surface 108 of substrate 110, which may assist with subsequently removing the formed battery electrode from substrate 110.

At block 614, the formed battery electrode 136 may be removed from substrate 110. Removing battery electrode 136 from substrate 110 may be facilitated by the dewetting condition of surface 108 of substrate 110 relative to the conductive material of current collector 116 and the electrode active material. A portion of current collector 116 extends in a direction 138 beyond edge 140 of first electrode active material layer 104*a* and in direction beyond edge 142 of second electrode active material layer 104*b*.

In example method 600, battery electrode 136 includes current collector 116 and two layers of electrode active material, one on each of surfaces 130 and 132 of current collector 116. In another example, only first electrode active material layer 104a is formed and the combination of first electrode active material layer 104a and current collector 116 is removed from substrate 110 following the heating of block 612 (the heating being performed to activate the dewetting condition of surface 108 of substrate 110 relative to conductive material 118).

Method 600 may be repeated to form additional battery electrodes of the same type (e.g., cathodes or anodes) and/or to form battery electrodes of the other type (e.g., cathodes or anodes). The additional electrodes might be formed using the same or a different substrate 110.

Figure 7:
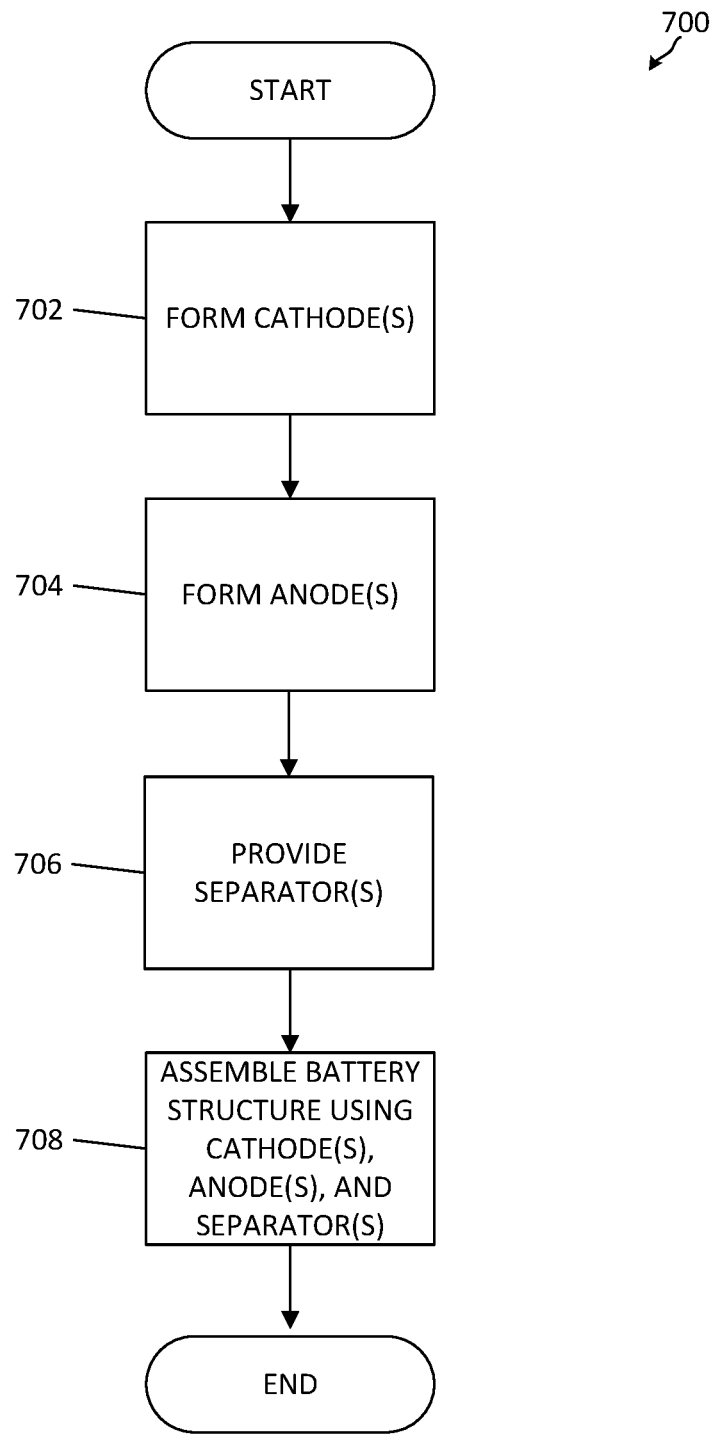
FIG. 7 illustrates an example method for assembling a battery, according to certain embodiments.

FIG. 7 illustrates an example method 700 for assembling a battery structure, according to certain embodiments. As examples, the battery structure being formed using method 700 could be battery structure 400 or battery structure 500.

At block 702, one or more cathodes 402 are formed, and at block 704 one or more anodes 404 are formed. Cathodes 402 and anodes 404 may be formed using process 102 and/or method 600. Furthermore, cathodes 402 may be formed individually or as part of an electrode sheet 200 that is subsequently cut to form individual cathodes 402. Similarly, anodes 404 may be formed individually or as part of an electrode sheet 200 that is subsequently cut to form individual anodes 404.

At block 706, one or more separators 406 are provided.

At block 708, a battery structure is assembled using the one or more cathodes 402, one or more anodes 404, and one or more separators 406. For example, the battery structure may be similar to battery structures 400 or 500, described above. In certain embodiments, assembling the battery structure includes positioning the cathodes 402 and anodes 404 on opposing sides of separator 406 such that cathodes 402 are separated from adjacent anodes 404 by separator 406 and anodes 404 are separated from adjacent cathodes 402 by separator 406. The battery structure may be stacked, rolled, folded, or assembled in another suitable manner. Current collectors 116 of cathodes 402 may be coupled in a suitable manner to a positive battery terminal 420, and current collectors of anodes 404 may be coupled in a suitable manner to a negative battery terminal 422. The cathode(s) 402, anode(s) 404, and separator 406 may be encased in a battery casing of a suitable type for the battery structure being formed (e.g., cylindrical, prismatic, or pouch). An electrolyte may be added within the battery casing.

The battery electrodes and battery structures described herein may be used for a variety of electronic devices and load. In some embodiments, the electronic device is a vehicle such as a rotorcraft, and the load is a device of the rotorcraft, such as a power converter, which may be part of an engine or propulsion unit of the rotorcraft.

Figure 8:
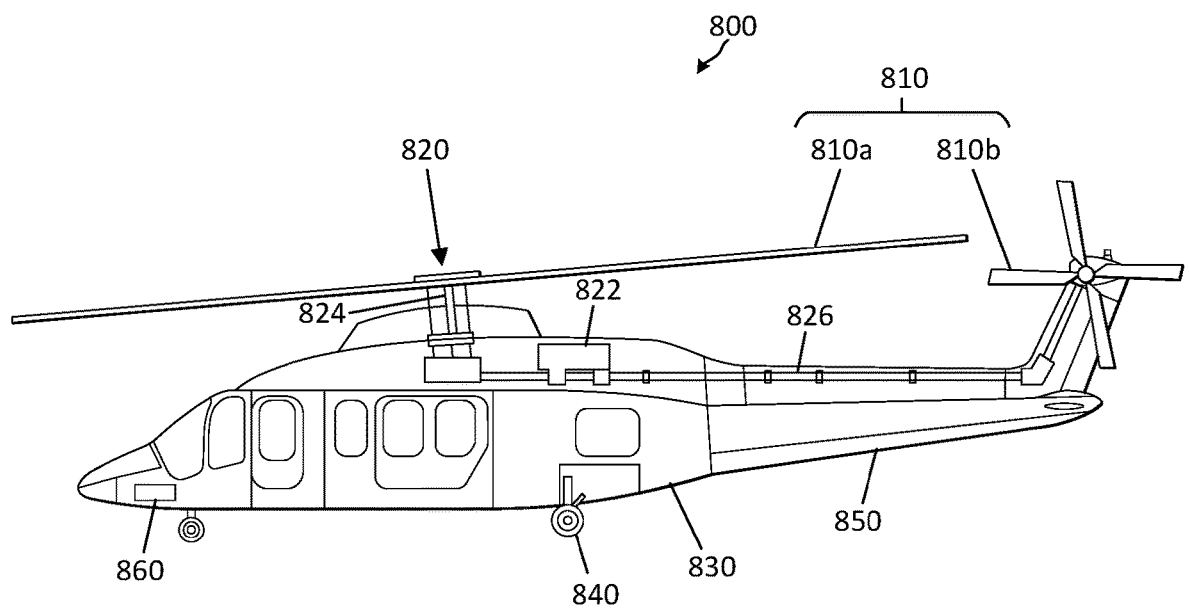
FIG. 8 illustrates aspects of an example rotorcraft, according to certain embodiments.

FIG. 8 illustrates aspects of an example rotorcraft 800, according to certain embodiments. Rotorcraft 800 includes rotor blades 810, a powertrain 820, a fuselage 830, landing gear 840, an empennage 850, and rotorcraft computers 860. It should be appreciated that some of teachings from rotorcraft 800 may apply to aircraft other than rotorcraft, such as airplanes, tilt rotor aircraft, unmanned aircraft, and the like.

Rotor blades 810 include main rotor blades 810a and tail rotor blades 810b. Powertrain 820 rotates main rotor blades 810a and optionally the tail rotor blades 810b. Powertrain 820 includes one or more engines 822, a rotor mast 824, and a drive shaft 826. Engines 822 supply torque to the rotor mast 824 via drive shaft 826 to rotate main rotor blades 810a. Engines 822 may also supply torque to drive shaft 826 to rotate tail rotor blades 810b.

Fuselage 830 represents the body of rotorcraft 800 and is coupled to powertrain 820 such that powertrain 820 and rotor blades 810 move fuselage 830 through the air during operation. Landing gear 840 supports rotorcraft 800 when rotorcraft 800 is grounded. Empennage 850 represents the tail section of the aircraft and is connected to tail rotor blades 810b. Powertrain 820 and tail rotor blades 810b may collectively provide thrust in the same direction as the rotation of main rotor blades 810a, so as to counter torque effects created by main rotor blades 810a.

The rotorcraft 800 includes flight control devices operable to change the flight characteristics of rotorcraft 800. The flight control devices can be part of rotor blades 810, powertrain 820, fuselage 830, and the like. The flight control devices include mechanical and/or electrical systems operable to change, e.g., the positions or angle of attack of rotor blades 810, the power output of engines 822, and the like. In some embodiments, the flight control devices include a swashplate for collectively or cyclically controlling the pitch of each of main rotor blades 110A in order to selectively control direction, thrust, and lift of rotorcraft 800. In some embodiments, the flight control devices include a tail rotor actuator for collectively controlling the pitch of tail rotor blades 810b in order to selectively control yaw of rotorcraft 800. In some embodiments, the flight control devices include an engine control computer for selectively varying the power output of engines 822. Other examples of flight control devices include horizontal or vertical stabilizers, rudder, elevators, or other control or stabilizing surfaces that are used to control or stabilize flight of rotorcraft 800.

Rotorcraft computers 860 are operable to collect data about, or control flight of, rotorcraft 800. In some embodiments, rotorcraft 800 is a fly-by-wire (FBW) rotorcraft, and rotorcraft computers 860 include flight control computers (FCCs) operable to execute one or more control laws (CLAWS) that control flight of rotorcraft 800. For example, rotorcraft computers 860 can send electrical signals to engines 822, the actuators for the swashplate, the tail rotor actuators, or the like to control flight of rotorcraft 800. Rotorcraft computers 860 may be operable to perform sensor data collection and analysis as part of a health and usage monitoring system (HUMS), a flight control system, a sensor system, a monitoring system, or the like.

Figure 9:
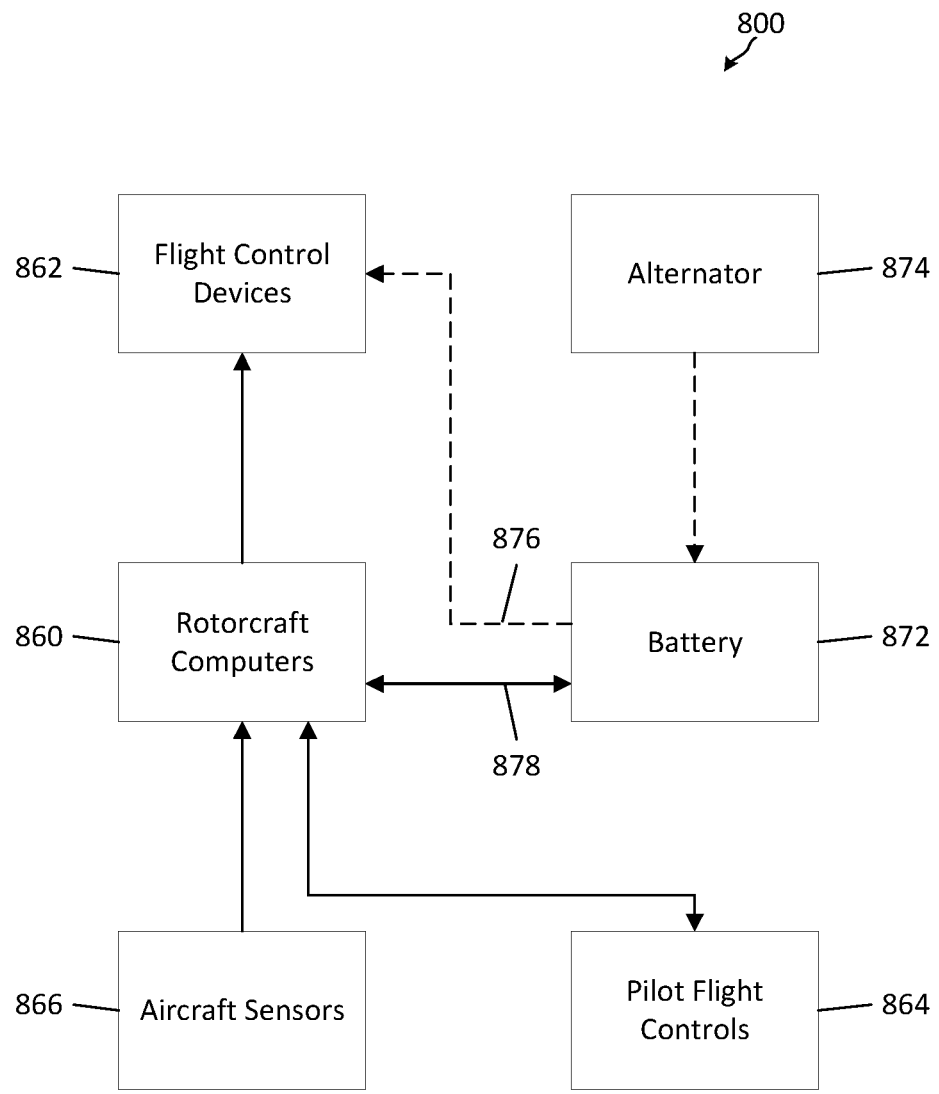
FIG. 9 is a block diagram of aspects of a rotorcraft, according to certain embodiments.

FIG. 9 is a block diagram of aspects of example rotorcraft 800, according to certain embodiments. Specifically, features for controlling flight of rotorcraft 800 are shown. Rotorcraft computers 860 can be part of a flight control system used to control flight control devices 862 (described above), thus controlling flight of rotorcraft 800. Rotorcraft computers 860 receive input signals from multiple sources, such as pilot flight controls 864 and aircraft sensors 866. Based on the input signals, rotorcraft computers 860 transmit control signals to flight control devices 862, which in certain embodiments may be an engine control computer of an engine.

Pilot flight controls 864 include manual controls that a pilot may manipulate to control flight of rotorcraft 800. Examples of pilot flight controls 864 include a cyclic stick, a collective stick, pedals, and the like. In some embodiments, one or more of pilot flight controls 864 include trim motors, which rotorcraft computers 860 can command to move to a particular position, thereby providing flight control suggestions to the pilot.

Aircraft sensors 866 include sensors for measuring a variety of rotorcraft systems, flight parameters, environmental conditions and the like. For example, aircraft sensors 866 may include sensors for measuring airspeed, altitude, attitude, position, orientation, temperature, airspeed, vertical speed, and the like. Other aircraft sensors 866 could include sensors relying upon data or signals originating external to rotorcraft 800, such as a global positioning system sensor, a VHF Omnidirectional Range sensor, Instrument Landing System (ILS), and the like.

The components of rotorcraft 800 (e.g., rotorcraft computers 860, flight control devices 862, etc.) are powered by a battery 872. Battery 872 may be a rechargeable battery, such as a lithium-ion battery, a lead-acid battery, or the like. Battery 872 may be charged onboard rotorcraft 800 (e.g., by an alternator 874), or may be charged by an external battery charger that is not part of rotorcraft 800. In some embodiments, battery 872 is part of (e.g., disposed/installed in) a propulsion unit of rotorcraft 800 (e.g., an engine 822, see FIG. 8). In another embodiment, battery 872 is part of other components of rotorcraft 800.

Charging of battery 872 may be controlled by a battery management system (BMS). For example, battery 872 may include a charging circuit that is controlled by the BMS. Parameters of battery 872 may also be monitored by the BMS. For example, battery 872 may include sensors for monitoring the discharge rate, cell voltages, temperature, and the like of battery 872, which the BMS receives signals from. The BMS may be partially or wholly embodied as software and/or hardware for performing the desired functionality. For example, the BMS may be embodied as software executed by rotorcraft computers 160, as hardware included with rotorcraft computers 160, as a standalone management circuit/controller, or the like. In the illustrated embodiment, the BMS is embodied as software executed by rotorcraft computers 860.

Battery 872 is connected to the components of rotorcraft 800 (e.g., flight control devices 862) by power connections 876, and the battery 872 is connected to the BMS (e.g., rotorcraft computers 860) by data connections 878. Power connections 876 carry the power provided to the components of rotorcraft 800. Data connections 878 carry data (e.g., control and/or sensor) signals communicated between the battery 872 and rotorcraft computers 860. Data connections 878 may be connections for a serial communications protocol, such as $I^2C$, SPI, RS232, or the like. Power connections 876 may be larger (e.g., have a lower gauge) than data connections 878.

In certain embodiments, battery 872 is formed in accordance with this disclosure. For example, battery 872 may be formed using process 102. In certain embodiments, battery 872 could be implemented as battery structure 400 or battery structure 500. Implementing battery 872 using current collectors formed in accordance with this disclosure may result in battery 872 being thinner, lighter, and/or potentially having increased energy density relative to batteries formed using conventional techniques.

Embodiments of this disclosure may provide none, some, or all of the following technical advantages. Furthermore, other advantages may be described in or understood from this disclosure.

A battery current collector according to conventional techniques may be one of the heaviest components in a battery, potentially accounting for 15 percent to as much as 50 percent of the weight of the battery. Certain embodiments allow formation of battery current collectors that are thinner and possibly lighter relative to current collectors that can be used with conventional techniques. For example, certain embodiments may be used to form current collectors that are about 5 µm to about 40 µm, and about 20 µm or less in particular embodiments. Certain embodiments of this disclosure allow thinner current collectors to be formed and assembled into a battery, while reducing or eliminating concerns with conventional electrode assembly processes that may be encountered with thinly formed current collectors, such as those in which current collectors are pre-formed in sheets that are rolled around a spool and must be robust (e.g., thick) enough to remain undamaged during handling.

Additionally, the conductive material of the current collectors may be a significant contributor to the overall weight of a battery. As made possible by certain embodiments of this disclosure, the ability to form thinner current collectors that include less conductive material and are therefore lighter may reduce the overall weight of a battery formed using such current collectors. A lighter battery generally is preferable because it results in a lighter device (e.g., vehicle, mobile phone, laptop computer, tablet computer, etc.) in which the battery is to be installed. Additionally, lighter batteries may ease recycling challenges, as the vehicles that transport batteries for recycling potentially can carry more batteries at once due to the lighter load per battery.

Furthermore, embodiments of this disclosure allow thinner current collectors to be formed without sacrificing the ability of the resulting current collectors to provide reliable performance in a resulting battery. For example, the processes used to deposit the current collector material are highly precise and controllable to ensure formation of a current collector layer that has adequate coverage and is suitably thick. As another example, forming the current collector layer directly on a previously deposited active material layer (e.g., rather than pre-forming the current collector layer, moving the pre-formed current collector layer around, and then coating the active layer on the current collector layer) may reduce or eliminate opportunities of the current collector to be damaged during the battery assembly process.

In certain embodiments, current collectors of reduced thickness may increase the energy density, the amount of energy a battery can store for a given weight, of lithium ion batteries, which may allow increased time between battery charges, essentially increasing capacity. This feature also may increase the service lifetime of the battery.

Embodiments can be applied to any suitable type of battery form factor, including cylindrical, prismatic, and pouch form factors. Furthermore, electrodes formed according to embodiments of this disclosure can be rolled, stacked, folded, or otherwise assembled into structure to form a battery.

Example embodiments of this disclosure are summarized here. Other embodiments can also be understood from the entirety of the specification as well as the claims filed herein.

Example 1. A method including providing a first substrate and forming a first battery electrode on the first substrate. Forming the first battery electrode on the first substrate includes depositing a first layer of a first electrode active material on a first portion of a surface of the first substrate and forming a first current collector that includes a first conductive material. Forming the first current collector includes depositing, using a sputter deposition process, the first conductive material on a surface of the first layer of the first electrode active material. The first conductive material is deposited over an edge of the first layer of the first electrode active material and onto a second portion of the surface of the first substrate, the second portion of the first substrate being adjacent to the first portion of the first substrate. The method further includes removing the first battery electrode from the first substrate, the first battery electrode including the first layer of the first electrode active material and the first current collector.

Example 2. The method of Example 1, where the first electrode active material includes: a cathode material such that the first battery electrode is a cathode; or an anode material such that the first battery electrode is an anode.

Example 3. The method of any one of Examples 1 and 2, where the first electrode active material includes a lithium oxide material.

Example 4. The method of any one of Examples 1 and 2, where the first electrode active material includes graphite.

Example 5. The method of any one of Examples 1-4, where: during deposition of the first layer of the first electrode active material, the first electrode active material includes an active component, a binding agent, and a solvent; and the method further includes heating, after depositing the first layer of the first electrode active material on the first portion of the surface of the first substrate and before forming the first current collector, the first electrode active material such that the solvent dries.

Example 6. The method of any one of Examples 1-5, where the sputter deposition process includes directing a first substance at a target layer to cause particles of the target layer to disengage from the target layer and be deposited onto the surface of the first layer of the first electrode active material and onto the second portion of the surface of the first substrate, the target layer including the first conductive material.

Example 7. The method of any one of Examples 1-6, where the first current collector has a thickness of about 5 micrometers to about 40 micrometers.

Example 8. The method of any one of Examples 1-7, where removing the first battery electrode from the first substrate is facilitated by a dewetting condition of the surface of the first substrate relative to the first conductive material and the first electrode active material, the dewetting condition being hydrophobicity or oleophobicity.

Example 9. The method of any one of Examples 1-8, further including, after forming the first current collector and before removing the first battery electrode from the first substrate, depositing a second layer of the first electrode active material on at least a portion of a first surface of the first current collector, the first surface of the first current collector contacting the second layer of the first electrode active material, a second surface of the first current collector contacting the first layer of the first electrode active material. The first battery electrode includes the first layer of the first electrode active material, the first current collector, and the second layer of the first electrode active material. A portion of the first current collector extends in a first direction beyond the edge of the first layer of the first electrode active material and in the first direction beyond an edge of the second layer of the first electrode active material.

Example 10. The method of any one of Examples 1-9, further including providing a second substrate and forming a second battery electrode on the second substrate. Forming the second battery electrode on the second substrate includes: depositing a first layer of a second electrode active material on a first portion of a surface of the second substrate; and forming a second current collector that includes a second conductive material. Forming the second current collector includes depositing, using a sputter deposition process, the second conductive material on a surface of the first layer of the second electrode active material, the second conductive material being deposited over an edge of the first layer of the second electrode active material and onto a second portion of the surface of the second substrate, the second portion of the second substrate being adjacent to the first portion of the second substrate. The method further includes removing the second battery electrode from the second substrate, the second battery electrode including the first layer of the second electrode active material and the second current collector. The first battery electrode is configured to have a first polarity and the second battery electrode is configured to have a second polarity that is opposite the first polarity.

Example 11. The method of any one of Examples 1-10, where: as removed from the first substrate, the first battery electrode is part of an electrode sheet; and the method further includes cutting the electrode sheet to form multiple battery electrodes, the first battery electrode being one of the multiple battery electrodes.

Example 12. A method including forming a first cathode on a first substrate. Forming the first cathode on the first substrate includes depositing a first layer of a cathode active material on a first portion of a surface of the first substrate and forming a first cathode current collector that includes a first conductive material. Forming the first cathode current collector includes depositing, using a physical vapor deposition (PVD) process, the first conductive material on a surface of the first layer of the cathode active material. The first conductive material is deposited over an edge of the first layer of the cathode active material and onto a second portion of the surface of the first substrate, the second portion of the first substrate being adjacent to the first portion of the first substrate. The method includes removing the first cathode from the first substrate, the first cathode including the first layer of the cathode active material and the first cathode current collector. The method further includes forming a first anode on a second substrate. Forming the first anode on the second substrate includes depositing a first layer of an anode active material on a first portion of a surface of the second substrate and forming a first anode current collector that includes a second conductive material. Forming the first anode current collector includes depositing, using a PVD process or chemical vapor deposition (CVD) process, the second conductive material on a surface of the first layer of the anode active material. The second conductive material is deposited over an edge of the first layer of the anode active material and onto a second portion of the surface of the second substrate, the second portion of the second substrate being adjacent to the first portion of the second substrate. The method includes removing the first anode from the second substrate, the first anode including the first layer of the anode active material and the first anode current collector. The method further includes disposing the first cathode to a first side of a first separator and disposing the first anode to a second side of the first separator such that at least a portion of the first separator separates the first cathode and the first anode.

Example 13. The method of Example 12, where each of the first cathode current collector and the first anode current collector has a thickness of about 5 micrometers to about 40 micrometers.

Example 14. The method of any one of Examples 12-13, further including encasing the first cathode, the first separator, and the first anode in a battery casing.

Example 15. The method of any one of Examples 12-14, further including forming a second cathode on a third substrate. Forming the second cathode on the third substrate includes: depositing a third layer of the cathode active material on a third portion of a surface of the third substrate; and forming a second cathode current collector that includes the first conductive material. Forming the second cathode current collector includes depositing, using a PVD process, the first conductive material on a surface of the third layer of the cathode active material, the first conductive material being deposited over an edge of the third layer of the cathode active material and onto a fourth portion of the surface of the third substrate, the fourth portion of the third substrate being adjacent to the third portion of the third substrate. The method further includes removing the second cathode from the third substrate, the second cathode including the third layer of the cathode active material and the second cathode current collector. The method further includes forming a second anode on a fourth substrate. Forming the second anode on the fourth substrate includes: depositing a third layer of the anode active material on a third portion of a surface of the fourth substrate; and forming a second anode current collector that includes the second conductive material. Forming the second anode current collector includes depositing, using a PVD process or a CVD process, the second conductive material on a surface of the third layer of the anode active material, the second conductive material being deposited over an edge of the third layer of the anode active material and onto a fourth portion of the surface of the fourth substrate, the fourth portion of the fourth substrate being adjacent to the third portion of the fourth substrate. The method further includes removing the second anode from the fourth substrate, the second anode including the third layer of the anode active material and the second anode current collector. The method further includes disposing the second cathode to a first side of a second separator; and disposing the second anode to a second side of the second separator such that at least a portion of the second separator separates the second cathode and the second anode; and encasing the second cathode, the second separator, and the second anode in the battery casing.

Example 16. The method of Example 15, where the first substrate and the third substrate are a same substrate, and the second substrate and the fourth substrate are a same substrate.

Example 17. A method including forming a battery electrode on a substrate. Forming the battery electrode on the substrate includes depositing a first electrode active material layer on a first portion of a surface of the substrate and depositing, to form a current collector, a conductive material using a thin film deposition process on a surface of the first electrode active material layer. The conductive material is deposited over an edge of the first electrode active material layer and onto a second portion of the surface of the substrate, the second portion of the substrate being adjacent to the first portion of the substrate. The method includes removing the battery electrode from the substrate, the battery electrode including the first electrode active material layer and the current collector.

Example 18. The method of Example 17, where the thin film deposition process includes a physical vapor deposition (PVD) process or a chemical vapor deposition (CVD) process.

Example 19. The method of any one of Examples 17-18, where: the first electrode active material layer includes a lithium metal oxide and the conductive material includes aluminum; or the first electrode active material layer includes graphite and the conductive material includes copper.

Example 20. The method of any one of Examples 17-19, further including, after forming the current collector and before removing the battery electrode from the substrate, depositing a second electrode active material layer on at least a portion of a first surface of the current collector, the first surface of the current collector contacting the second electrode active material layer, a second surface of the current collector contacting the first electrode active material layer. The battery electrode includes the first electrode active material layer, the current collector, and the second electrode active material layer.

Illustrative embodiments of the system and method of the present disclosure are described above. In the interest of clarity, all features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method, comprising:
   forming a first cathode on a first substrate, wherein forming the first cathode on the first substrate comprises:
      depositing a first layer of a cathode active material on a first portion of a surface of the first substrate; and
      forming a first cathode current collector that comprises a first conductive material, wherein forming the first cathode current collector comprises depositing, using a physical vapor deposition (PVD) process, the first conductive material on a surface of the first layer of the cathode active material, the first conductive material being deposited over an edge of the first layer of the cathode active material and onto a second portion of the surface of the first substrate, the second portion of the first substrate being adjacent to the first portion of the first substrate;
   removing the first cathode from the first substrate, the first cathode comprising the first layer of the cathode active material and the first cathode current collector; and
   disposing the first cathode to a first side of a first separator such that at least a portion of the first separator separates the first cathode and a first anode.

2. The method of claim 1, wherein the first cathode current collector has a thickness of about 5 micrometers to about 40 micrometers.

3. The method of claim 1, further comprising encasing the first cathode, the first separator, and the first anode in a battery casing.

4. The method of claim 3, further comprising:
forming a second cathode on a second substrate, wherein forming the second cathode on the second substrate comprises:
depositing a second layer of the cathode active material on a third portion of a surface of the second substrate; and
forming a second cathode current collector that comprises the first conductive material, wherein forming the second cathode current collector comprises depositing, using a PVD process, the first conductive material on a surface of the second layer of the cathode active material, the first conductive material being deposited over an edge of the second layer of the cathode active material and onto a fourth portion of the surface of the second substrate, the fourth portion of the second substrate being adjacent to the third portion of the second substrate;
removing the second cathode from the second substrate, the second cathode comprising the second layer of the cathode active material and the second cathode current collector;
disposing the second cathode to a first side of a second separator such that at least a portion of the second separator separates the second cathode and a second anode; and
encasing the second cathode, the second separator, and the second anode in the battery casing.

5. The method of claim 4, wherein the first substrate and the second substrate are a same substrate.

6. The method of claim 1, wherein the cathode active material comprises a lithium oxide material.

7. The method of claim 1, wherein:
during deposition of the first layer of the cathode active material, the cathode active material comprises an active component, a binding agent, and a solvent; and
the method further comprises heating, after depositing the first layer of the cathode active material on the first portion of the surface of the first substrate and before forming the first cathode current collector, the cathode active material such that the solvent dries.

8. The method of claim 1, wherein removing the first cathode from the first substrate is facilitated by a dewetting condition of the surface of the first substrate relative to the first conductive material and the cathode active material, the dewetting condition being hydrophobicity or oleophobicity.

9. The method of claim 1, wherein:
the method further comprises, after forming the first cathode current collector and before removing the first cathode from the first substrate, depositing a second layer of the cathode active material on at least a portion of a first surface of the first cathode current collector, the first surface of the first cathode current collector contacting the second layer of the cathode active material, a second surface of the first cathode current collector contacting the first layer of the cathode active material;
the first cathode comprises the first layer of the cathode active material, the first cathode current collector, and the second layer of the cathode active material; and a portion of the first cathode current collector extends in a first direction beyond the edge of the first layer of the cathode active material and in the first direction beyond an edge of the second layer of the cathode active material.

10. The method of claim 1, wherein:
as removed from the first substrate, the first cathode is part of an electrode sheet; and
the method further comprises cutting the electrode sheet to form a plurality of cathodes, the first cathode being one of the plurality of cathodes.

11. A method, comprising:
forming a first anode on a first substrate, wherein forming the first anode on the first substrate comprises:
depositing a first layer of an anode active material on a first portion of a surface of the first substrate; and
forming a first anode current collector that comprises a first conductive material, wherein forming the first anode current collector comprises depositing, using a PVD process or chemical vapor deposition (CVD) process, the first conductive material on a surface of the first layer of the anode active material, the first conductive material being deposited over an edge of the first layer of the anode active material and onto a second portion of the surface of the first substrate, the second portion of the first substrate being adjacent to the first portion of the first substrate;
removing the first anode from the first substrate, the first anode comprising the first layer of the anode active material and the first anode current collector; and
disposing the first anode to a first side of a first separator such that at least a portion of the first separator separates the first anode and a first cathode.

12. The method of claim 11, wherein the first anode current collector has a thickness of about 5 micrometers to about 40 micrometers.

13. The method of claim 11, further comprising encasing the first cathode, the first separator, and the first anode in a battery casing.

14. The method of claim 13, further comprising:
forming a second anode on a second substrate, wherein forming the second anode on the second substrate comprises:
depositing a second layer of the anode active material on a third portion of a surface of the second substrate; and
forming a second anode current collector that comprises the first conductive material, wherein forming the second anode current collector comprises depositing, using a PVD process or CVD process, the first conductive material on a surface of the second layer of the anode active material, the first conductive material being deposited over an edge of the second layer of the anode active material and onto a fourth portion of the surface of the second substrate, the fourth portion of the second substrate being adjacent to the third portion of the second substrate;
removing the second anode from the second substrate, the second anode comprising the second layer of the anode active material and the second anode current collector;
disposing the second anode to a first side of a second separator such that at least a portion of the second separator separates the second anode and a second cathode; and
encasing the second cathode, the second separator, and the second anode in the battery casing.

15. The method of claim 14, wherein the first substrate and the second substrate are a same substrate.

16. The method of claim 11, wherein the anode active material comprises graphite.

17. The method of claim 11, wherein:
   during deposition of the first layer of the anode active material, the anode active material comprises an active component, a binding agent, and a solvent; and
   the method further comprises heating, after depositing the first layer of the anode active material on the first portion of the surface of the first substrate and before forming the first anode current collector, the anode active material such that the solvent dries.

18. The method of claim 11, wherein removing the first anode from the first substrate is facilitated by a dewetting condition of the surface of the first substrate relative to the first conductive material and the anode active material, the dewetting condition being hydrophobicity or oleophobicity.

19. The method of claim 11, wherein:
   the method further comprises, after forming the first anode current collector and before removing the first anode from the first substrate, depositing a second layer of the anode active material on at least a portion of a first surface of the first anode current collector, the first surface of the first anode current collector contacting the second layer of the anode active material, a second surface of the first anode current collector contacting the first layer of the anode active material;
   the first anode comprises the first layer of the anode active material, the first anode current collector, and the second layer of the anode active material; and
   a portion of the first anode current collector extends in a first direction beyond the edge of the first layer of the anode active material and in the first direction beyond an edge of the second layer of the anode active material.

20. The method of claim 11, wherein:
   as removed from the first substrate, the first anode is part of an electrode sheet; and
   the method further comprises cutting the electrode sheet to form a plurality of anodes, the first anode being one of the plurality of anodes.

* * * * *